US012338572B2

(12) United States Patent
Park et al.

(10) Patent No.: US 12,338,572 B2
(45) Date of Patent: Jun. 24, 2025

(54) CLOTHING TREATMENT APPARATUS AND METHOD FOR CONTROLLING SAME

(71) Applicant: LG Electronics Inc., Seoul (KR)

(72) Inventors: Jeong Yeon Park, Seoul (KR); Chang Kyu Kim, Seoul (KR); Jihyun Yoon, Seoul (KR); Taehee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 17/793,176

(22) PCT Filed: Jan. 6, 2021

(86) PCT No.: PCT/KR2021/000149
§ 371 (c)(1),
(2) Date: Jul. 15, 2022

(87) PCT Pub. No.: WO2021/145602
PCT Pub. Date: Jul. 22, 2021

(65) Prior Publication Data

US 2023/0056925 A1 Feb. 23, 2023

(30) Foreign Application Priority Data

Jan. 15, 2020 (KR) ........................ 10-2020-0005537
Jan. 16, 2020 (KR) ........................ 10-2020-0006070
Jan. 28, 2020 (KR) ........................ 10-2020-0010010

(51) Int. Cl.
*D06F 73/00* (2006.01)
*D06F 73/02* (2006.01)
(Continued)

(52) U.S. Cl.
CPC .............. *D06F 73/00* (2013.01); *D06F 73/02* (2013.01); *B05B 7/16* (2013.01); *B05B 15/68* (2018.02); *D06F 87/00* (2013.01)

(58) Field of Classification Search
CPC ........... D06F 73/00; D06F 73/02; D06F 87/00
See application file for complete search history.

(56) References Cited

U.S. PATENT DOCUMENTS 3,805,425 A * 4/1974 Spoida .................... D06F 87/00 392/404
3,934,766 A * 1/1976 Bailey ..................... D06F 71/28 223/51
(Continued)

FOREIGN PATENT DOCUMENTS

JP H07-124393 5/1995
JP 2003-033597 A 2/2003
(Continued)

OTHER PUBLICATIONS

Office Action in Korean Appln. No. 20200005537, mailed on Jun. 30, 2023, 11 pages (with English translation).
(Continued)

*Primary Examiner* — Joseph L. Perrin
(74) *Attorney, Agent, or Firm* — Fish & Richardson P.C.

(57) ABSTRACT

A clothing treatment apparatus includes a heating unit for heating a fluid; a movable spray unit; a flow path member for supplying the heated fluid to the movable spray unit; and a driving unit for moving the movable spray unit. The flow path member can be bent at an angle of a specific range per unit member or unfolded. The clothing treatment apparatus includes a body portion spreading unit (1500) for spreading a body portion of clothing. The body portion spreading unit includes a body portion spreading arm of which at least a portion is arranged inside the body portion and which rotationally moves about an end portion as a rotary shaft; and a first driving unit for rotationally moving the body portion spreading arm.

19 Claims, 29 Drawing Sheets

(51) Int. Cl.
*B05B 7/16* (2006.01)
*B05B 15/68* (2018.01)
*D06F 87/00* (2006.01)

(56) References Cited

U.S. PATENT DOCUMENTS

| | | | | |
|---|---|---|---|---|
| 4,756,934 A * | 7/1988 | Ukawa | D06B 5/24 | 118/679 |
| 2010/0282785 A1 * | 11/2010 | Roselle | D06F 73/02 | 223/61 |
| 2012/0317729 A1 * | 12/2012 | Song | D06F 58/10 | 68/6 |
| 2018/0002860 A1 * | 1/2018 | Song | D06F 58/10 | |
| 2019/0017219 A1 * | 1/2019 | Song | D06F 58/10 | |
| 2019/0169789 A1 * | 6/2019 | Cho | D06F 35/00 | |
| 2020/0040504 A1 * | 2/2020 | Rochford | D06F 73/02 | |
| 2022/0145525 A1 * | 5/2022 | Roh | D06L 1/20 | |

FOREIGN PATENT DOCUMENTS

| | | |
|---|---|---|
| JP | 2007-117322 | 5/2007 |
| JP | 20150122809 | 7/2018 |
| KR | 20100022382 | 3/2010 |
| KR | 20100100501 | 9/2010 |
| KR | 10-2010-0121201 | 11/2010 |
| KR | 20110099914 | 9/2011 |
| KR | 10-2012-0094278 | 8/2012 |
| KR | 20180017716 | 2/2018 |
| KR | 20180037459 | 4/2018 |
| KR | 20180078922 | 7/2018 |
| KR | 20180126838 | 11/2018 |
| KR | 20190050738 | 5/2019 |
| KR | 2019110651 | 7/2019 |
| TW | 201708656 | 3/2017 |
| WO | WO 2018/030692 | 2/2018 |
| WO | WO 2018/066933 | 4/2018 |

OTHER PUBLICATIONS

Extended European Search Report in European Appln. No. 21740764.2, mailed on Dec. 19, 2023, 11 pages.

Office Action in Korean Appln. No. 10-2020-0006070, mailed on May 1, 2024, 10 pages (with English translation).

Office Action in Korean Appln. No. 10-2020-0010010, mailed on May 1, 2024, 10 pages (with English translation).

Notice of Allowance in Korean Appln. No. 10-2020-0010010, mailed on Nov. 30, 2024, 10 pages (with English translation).

* cited by examiner

[FIG. 1]
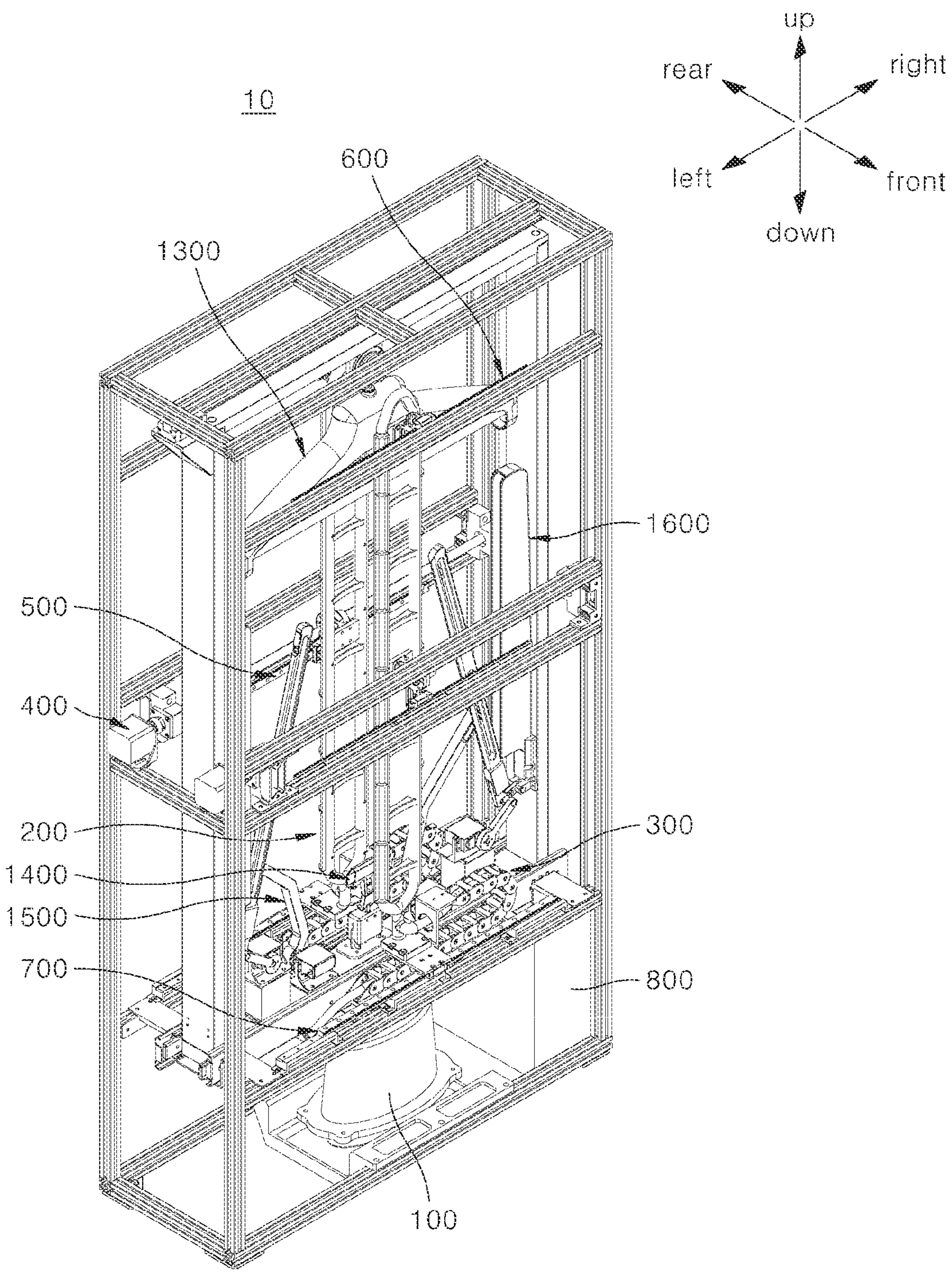

[FIG. 2]
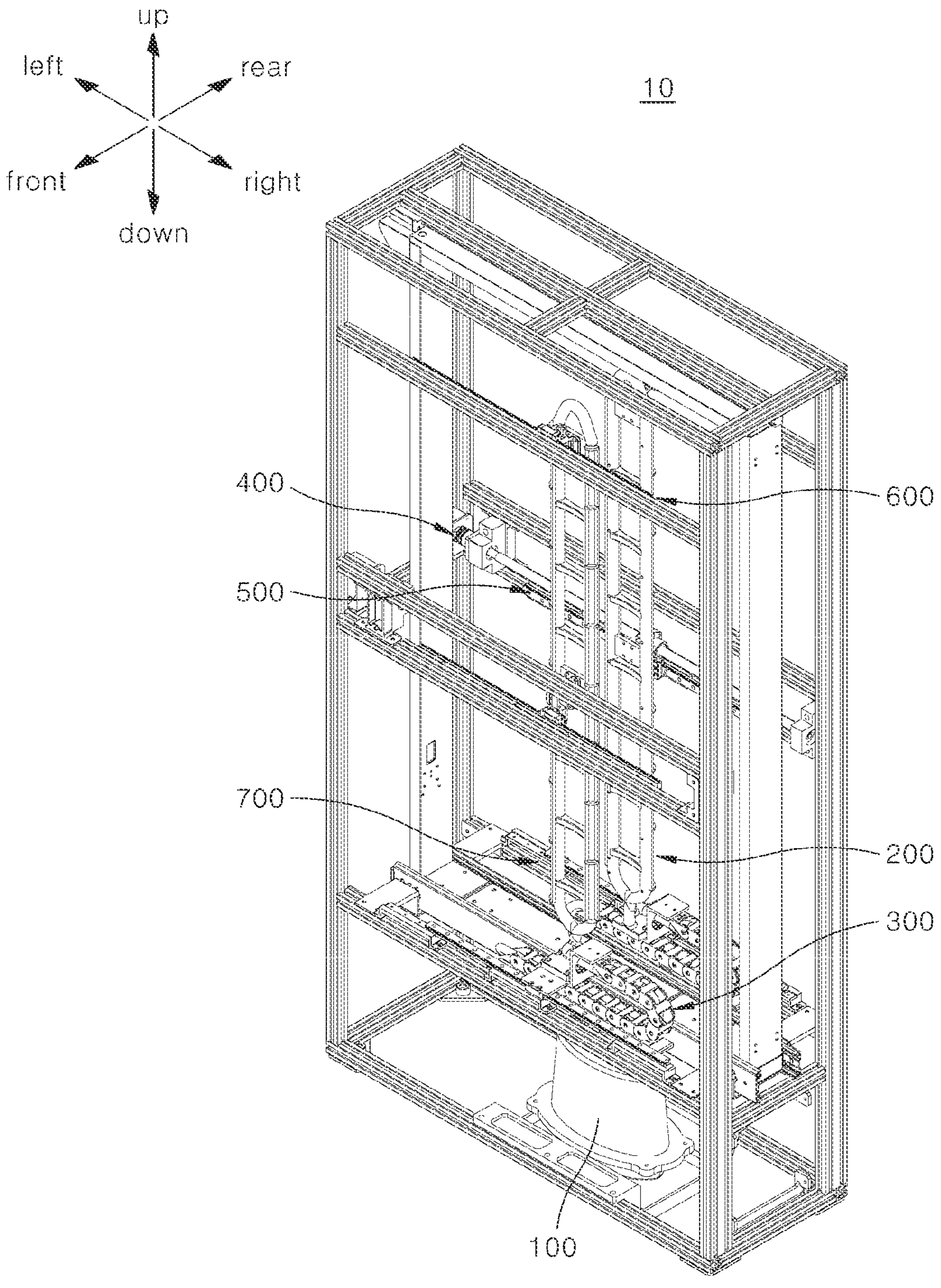

[FIG. 3]
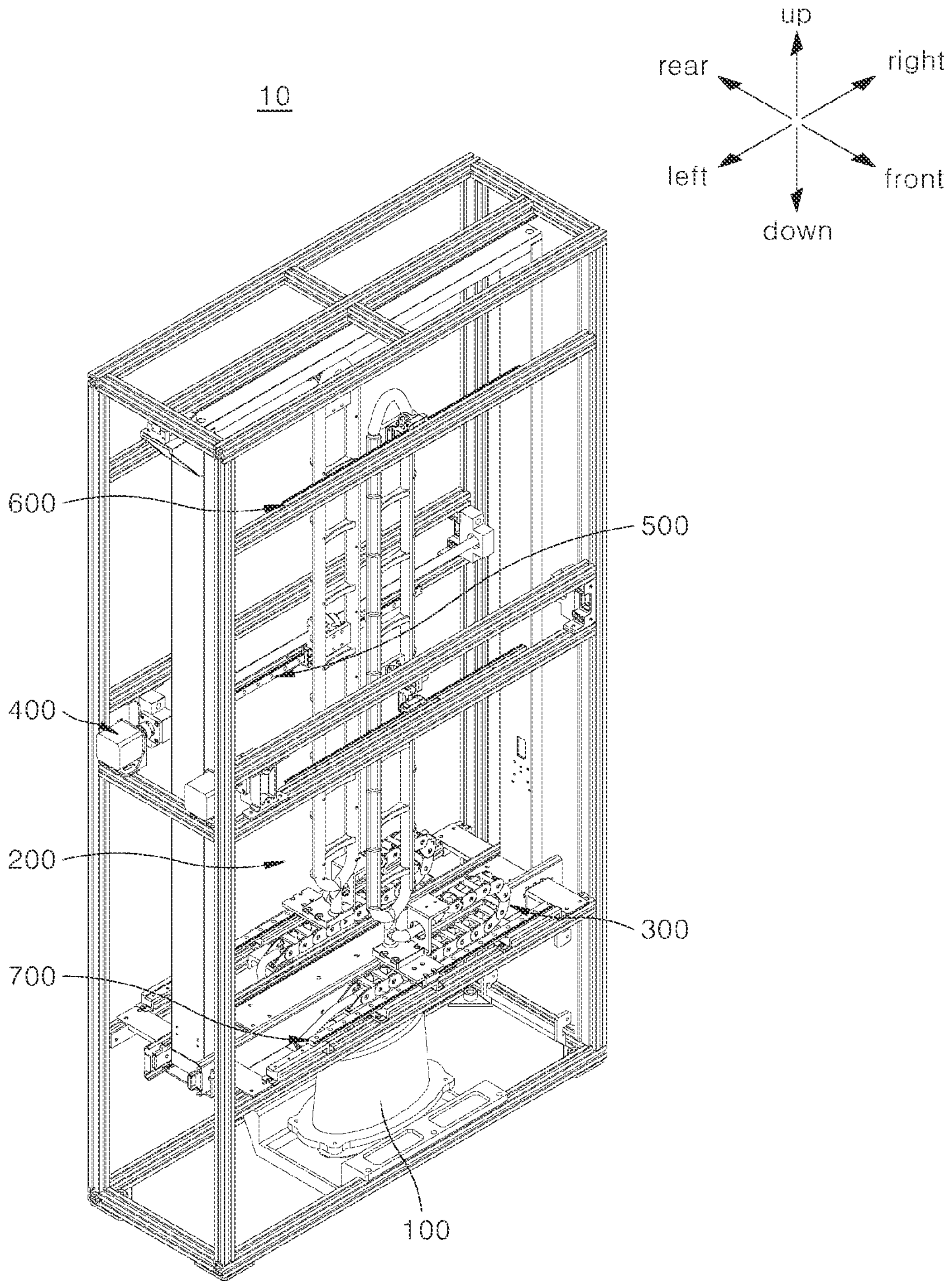

[FIG. 4]
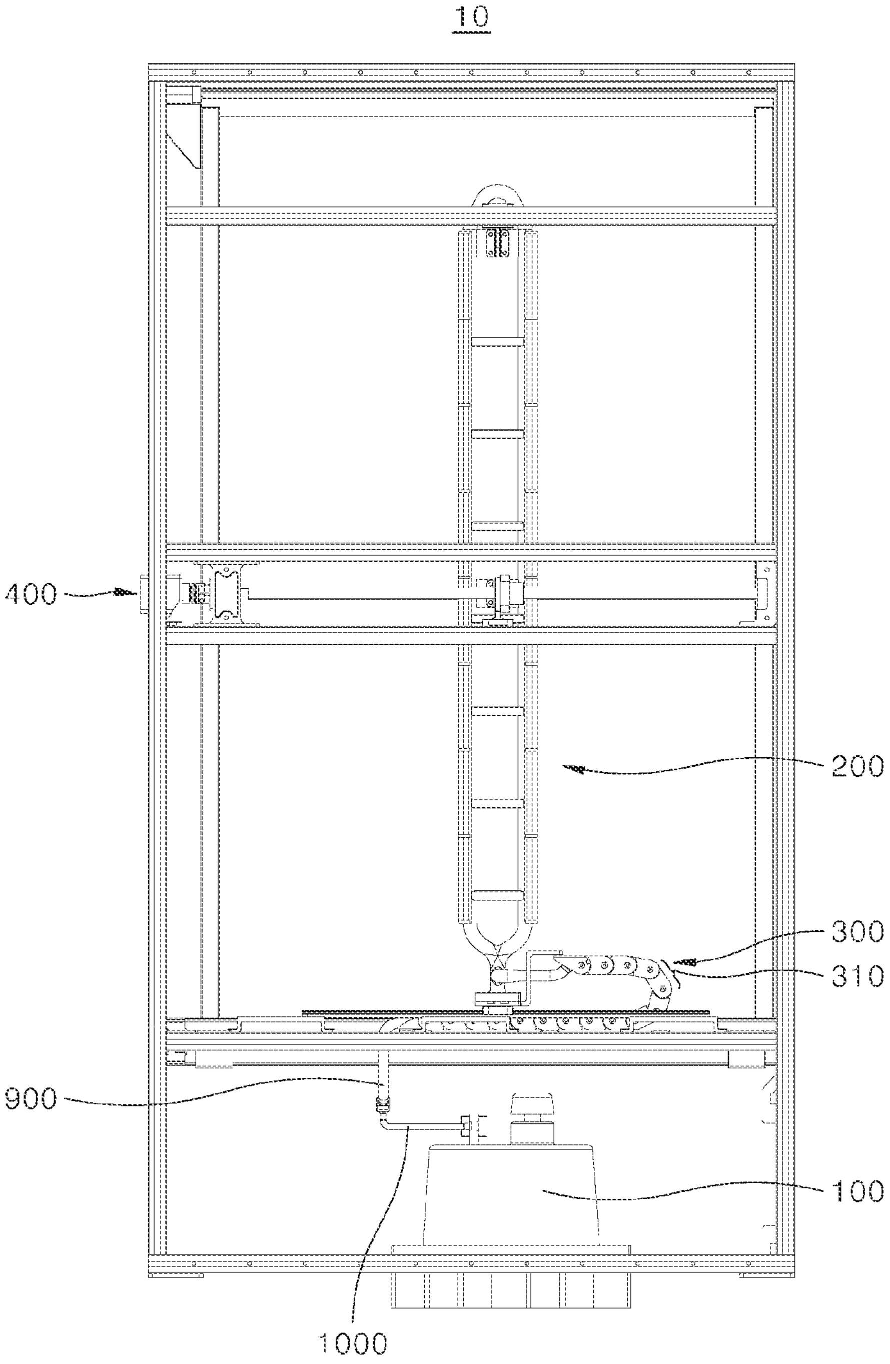

[FIG. 5]
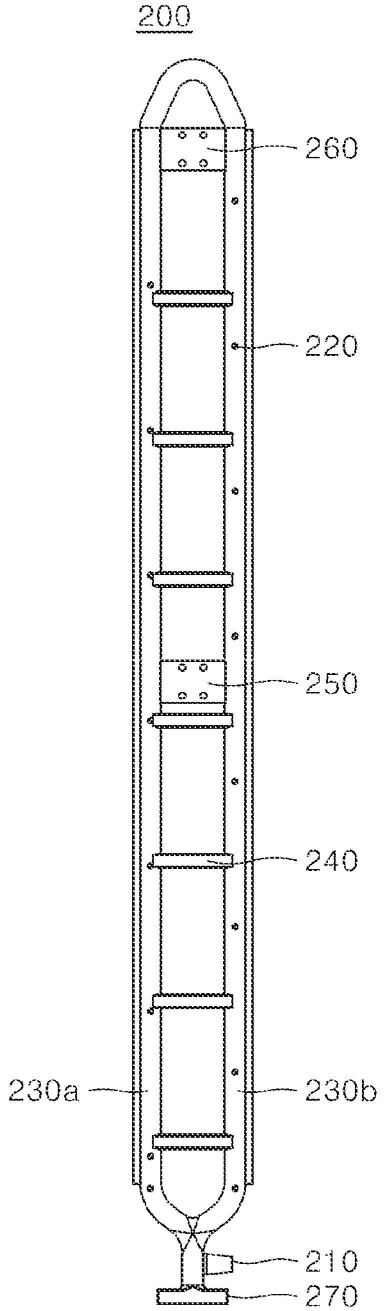

[FIG. 6]
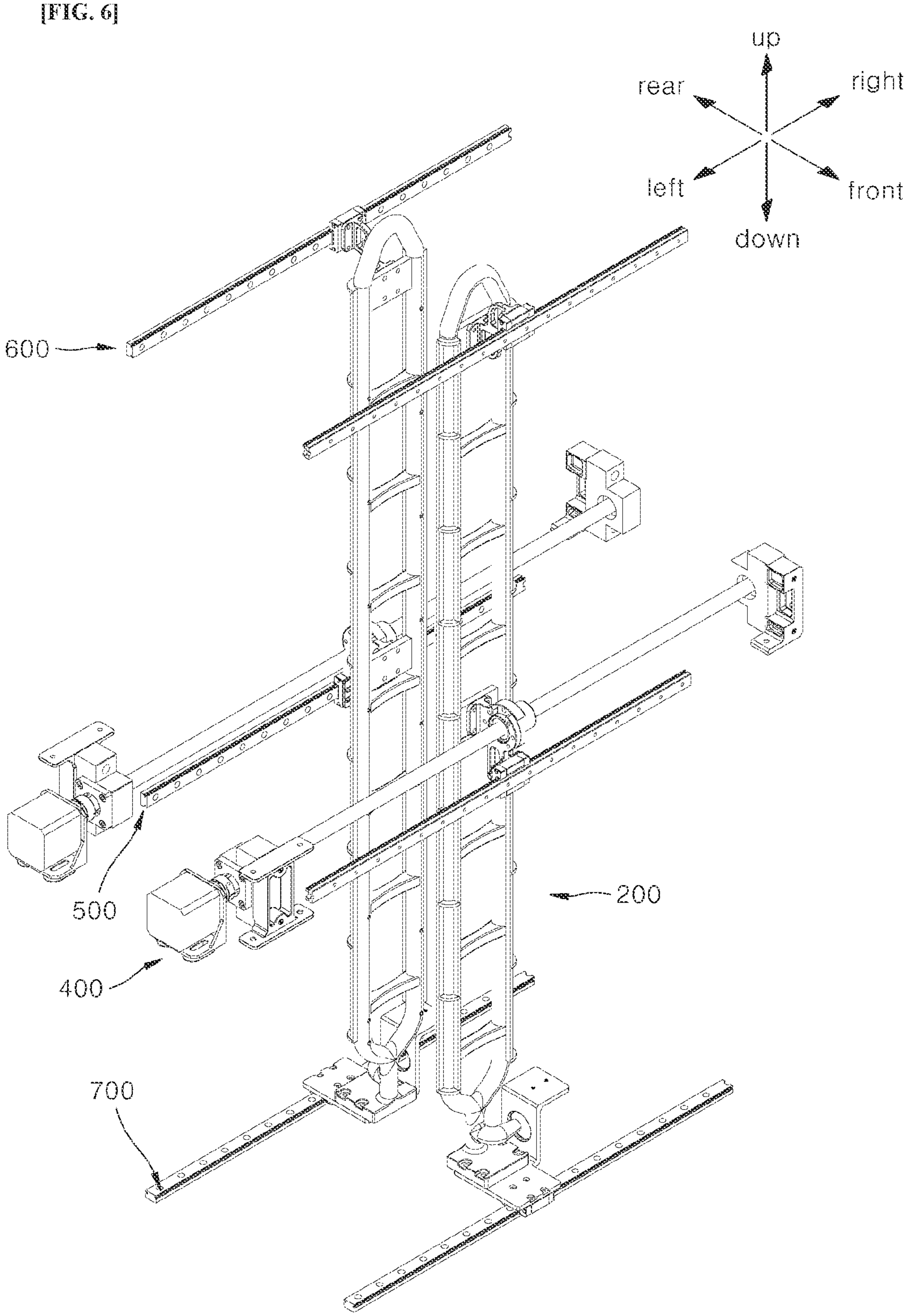

[FIG. 7]
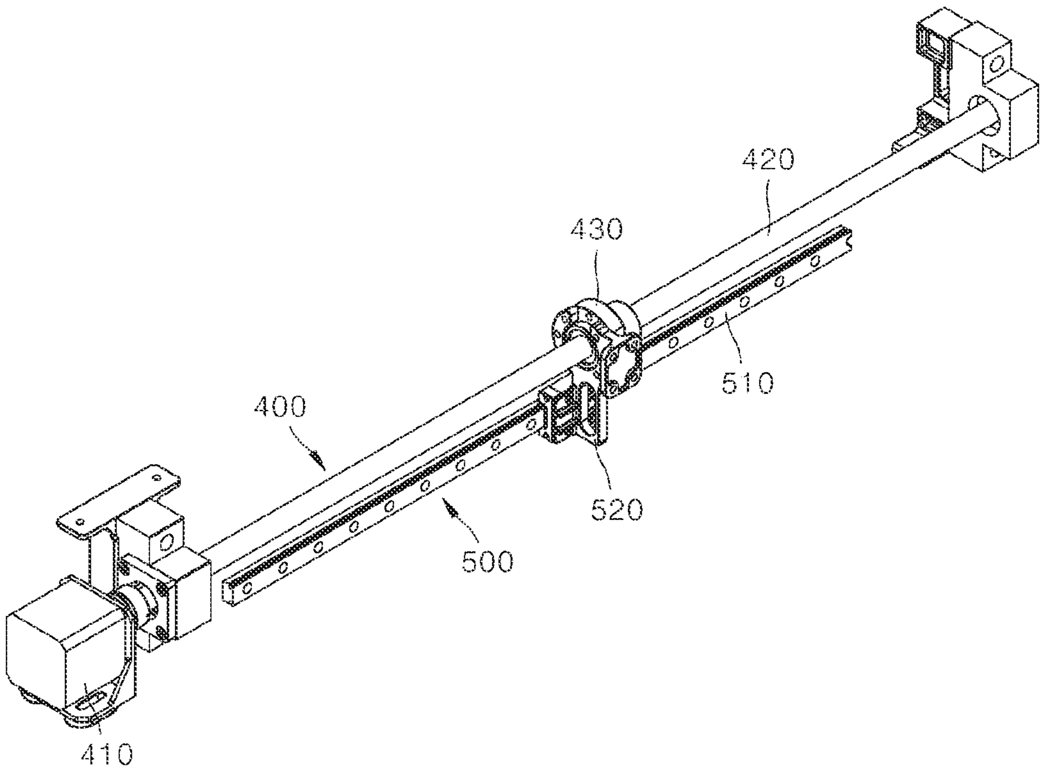
[FIG. 8]
600
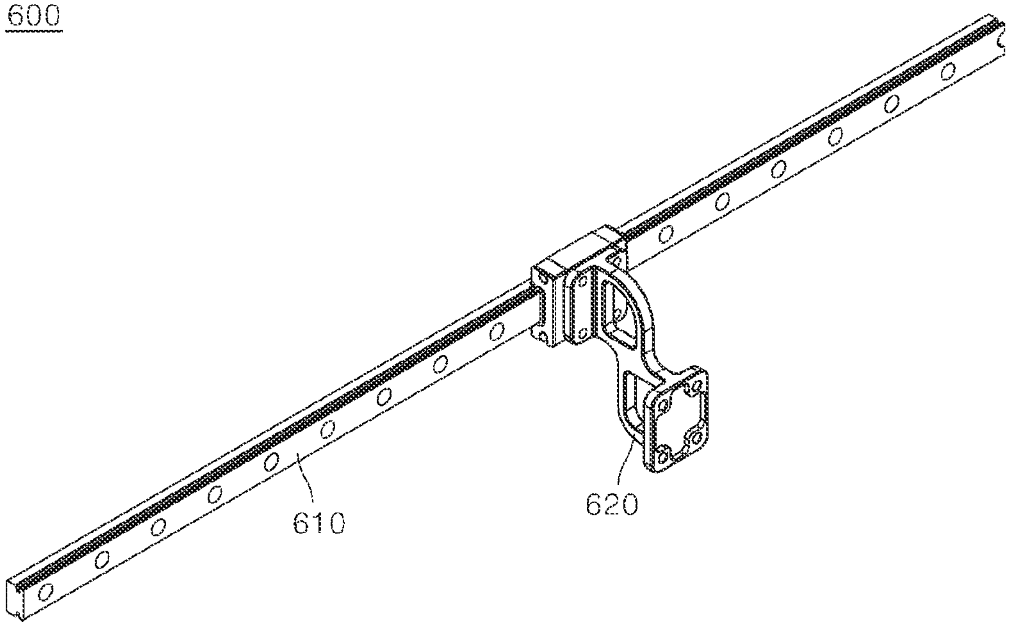

[FIG. 9]
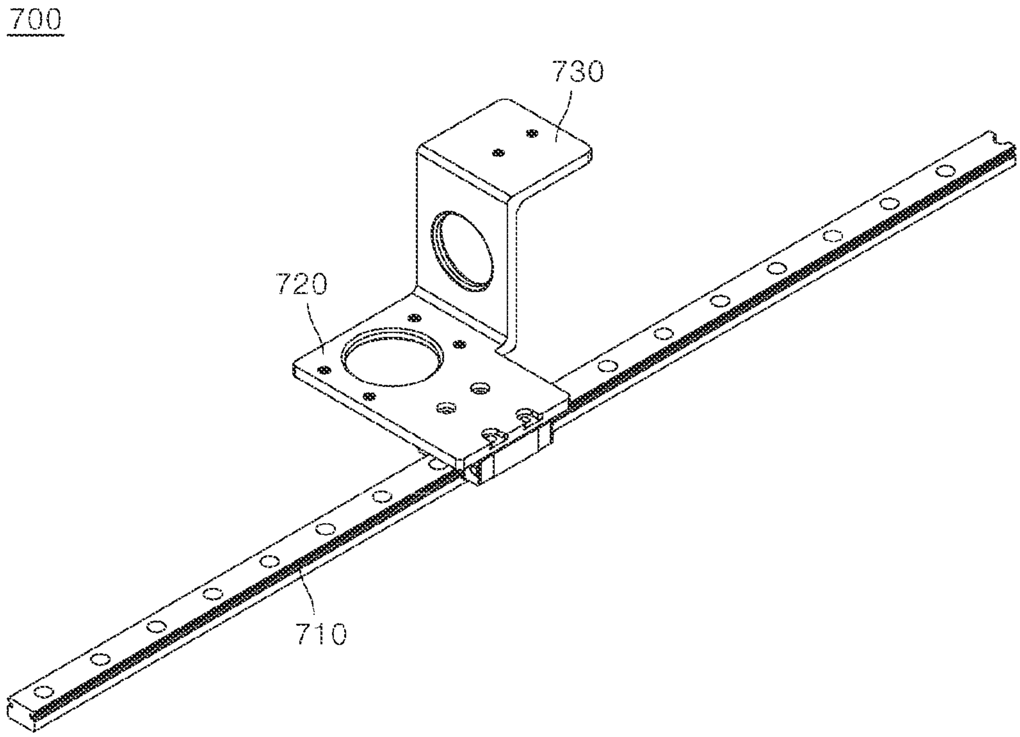

[FIG. 10]
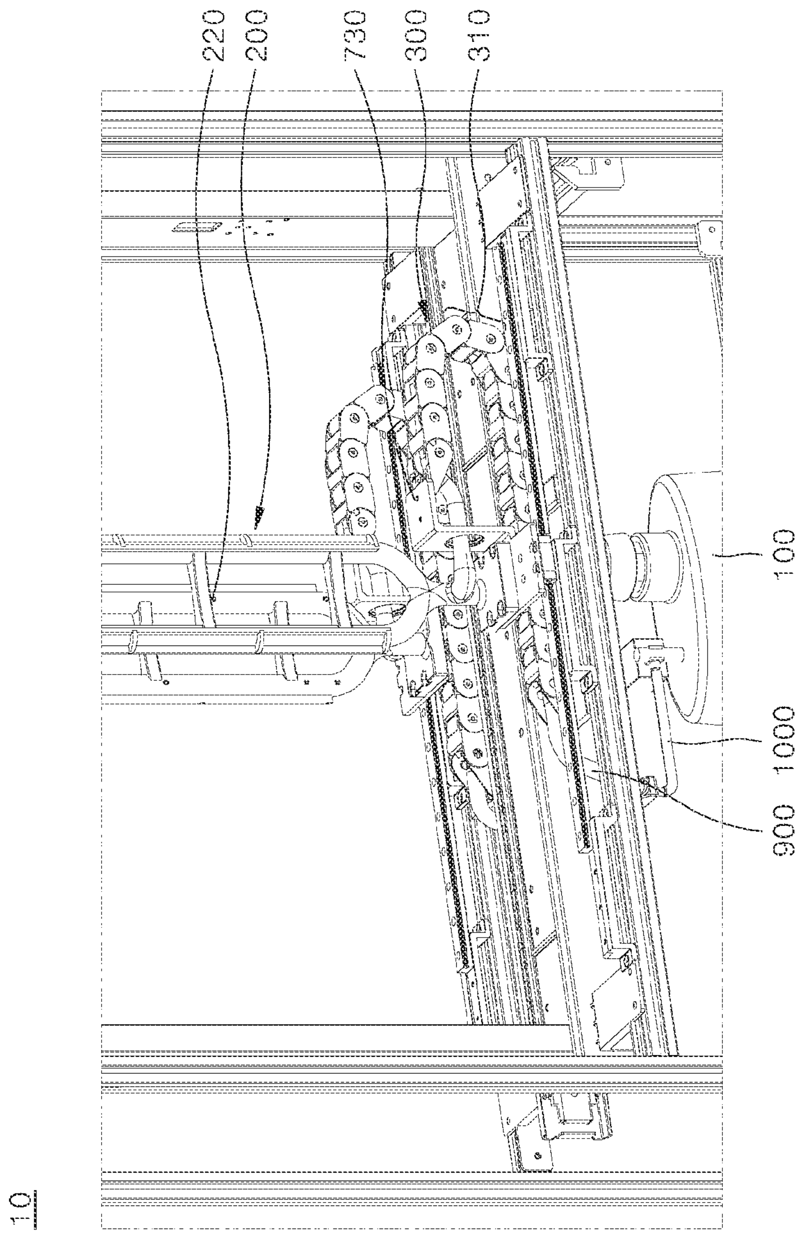

[FIG. 11]
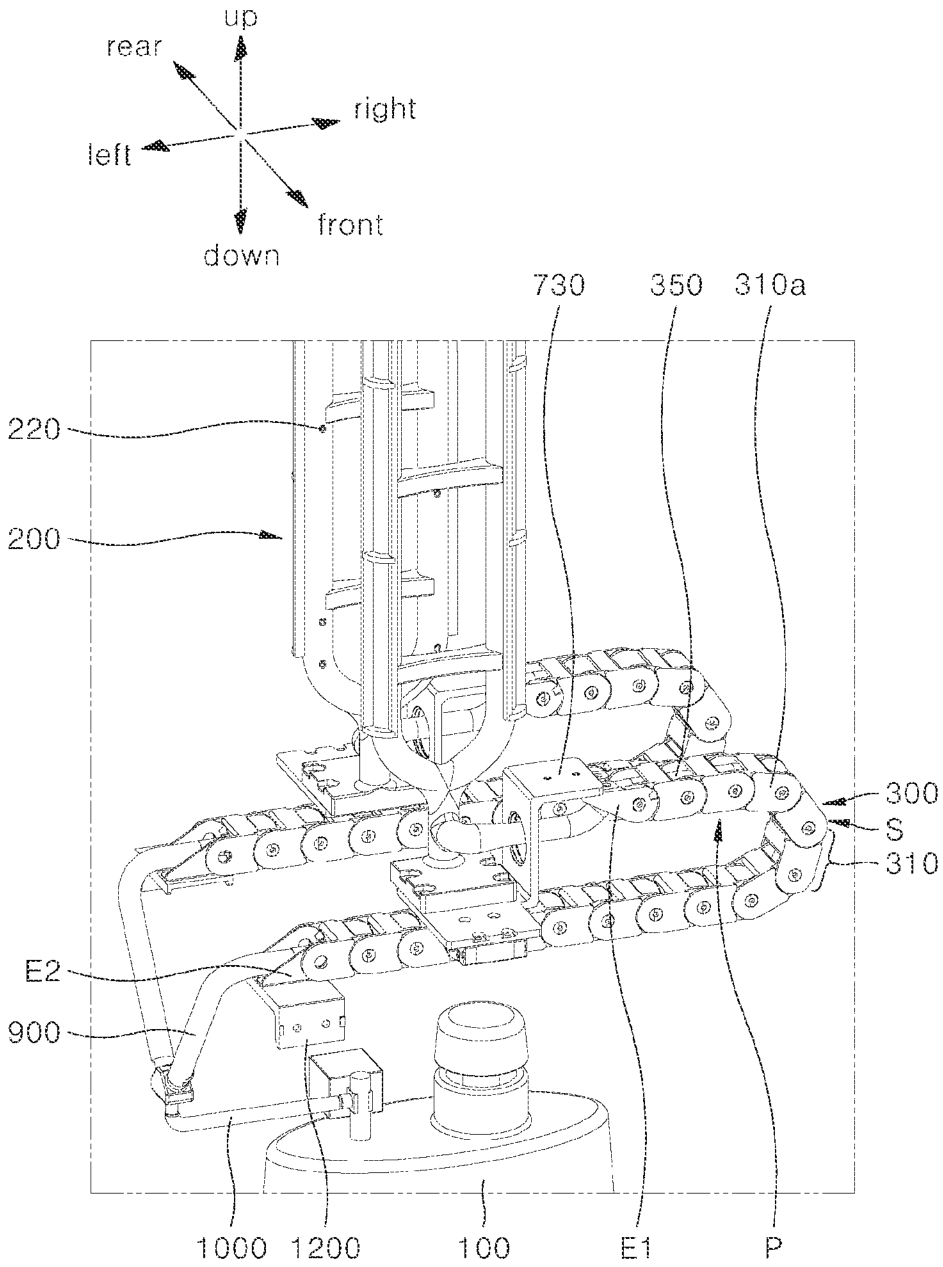

[FIG. 12]
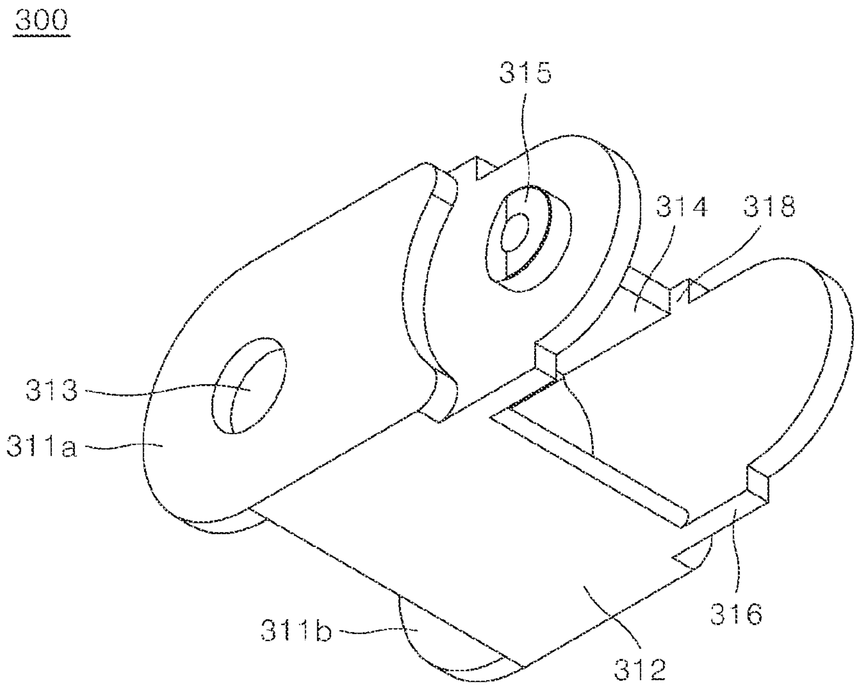
[FIG. 13]
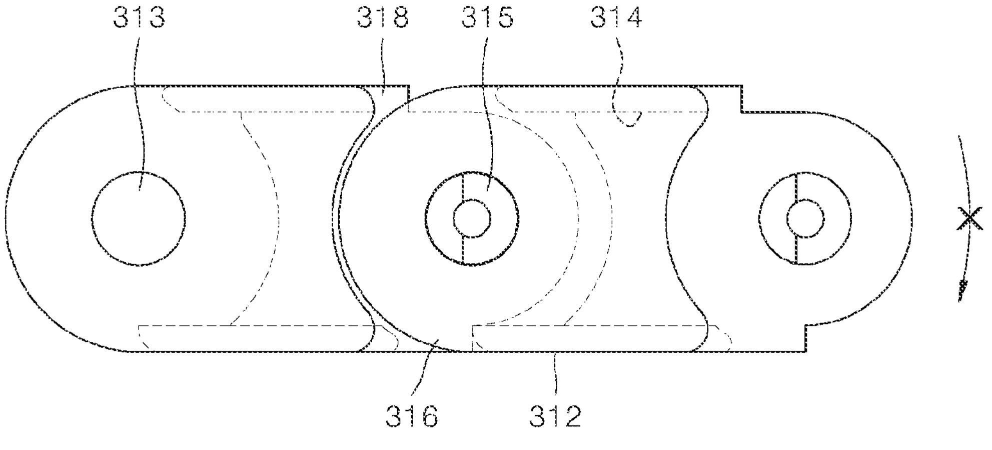

[FIG. 14]
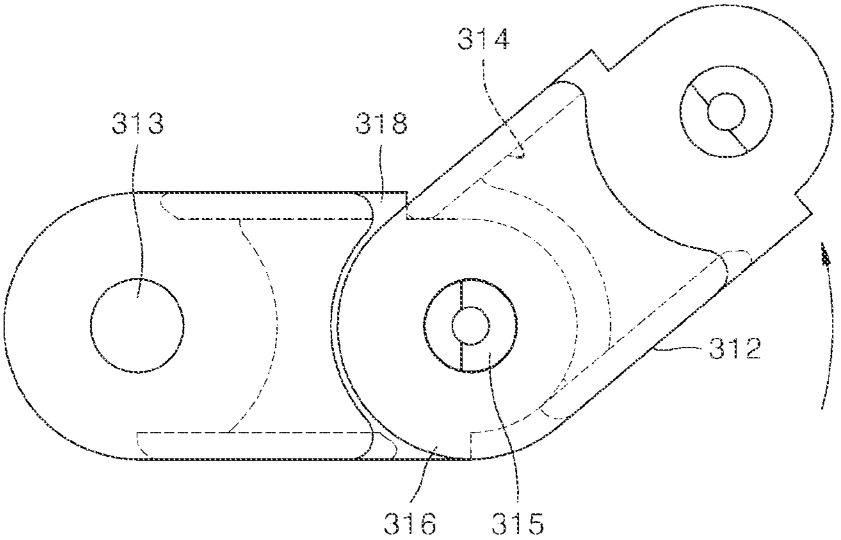
[FIG. 15]
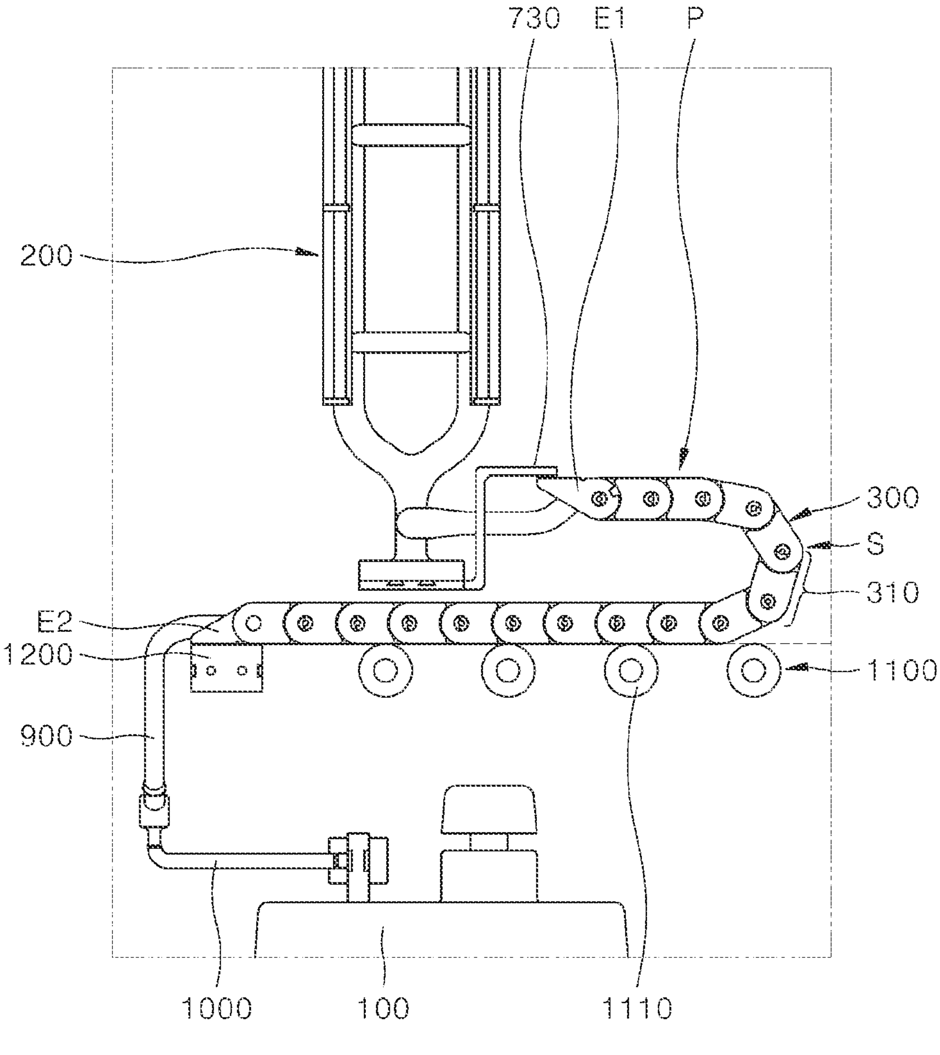

[FIG. 16]
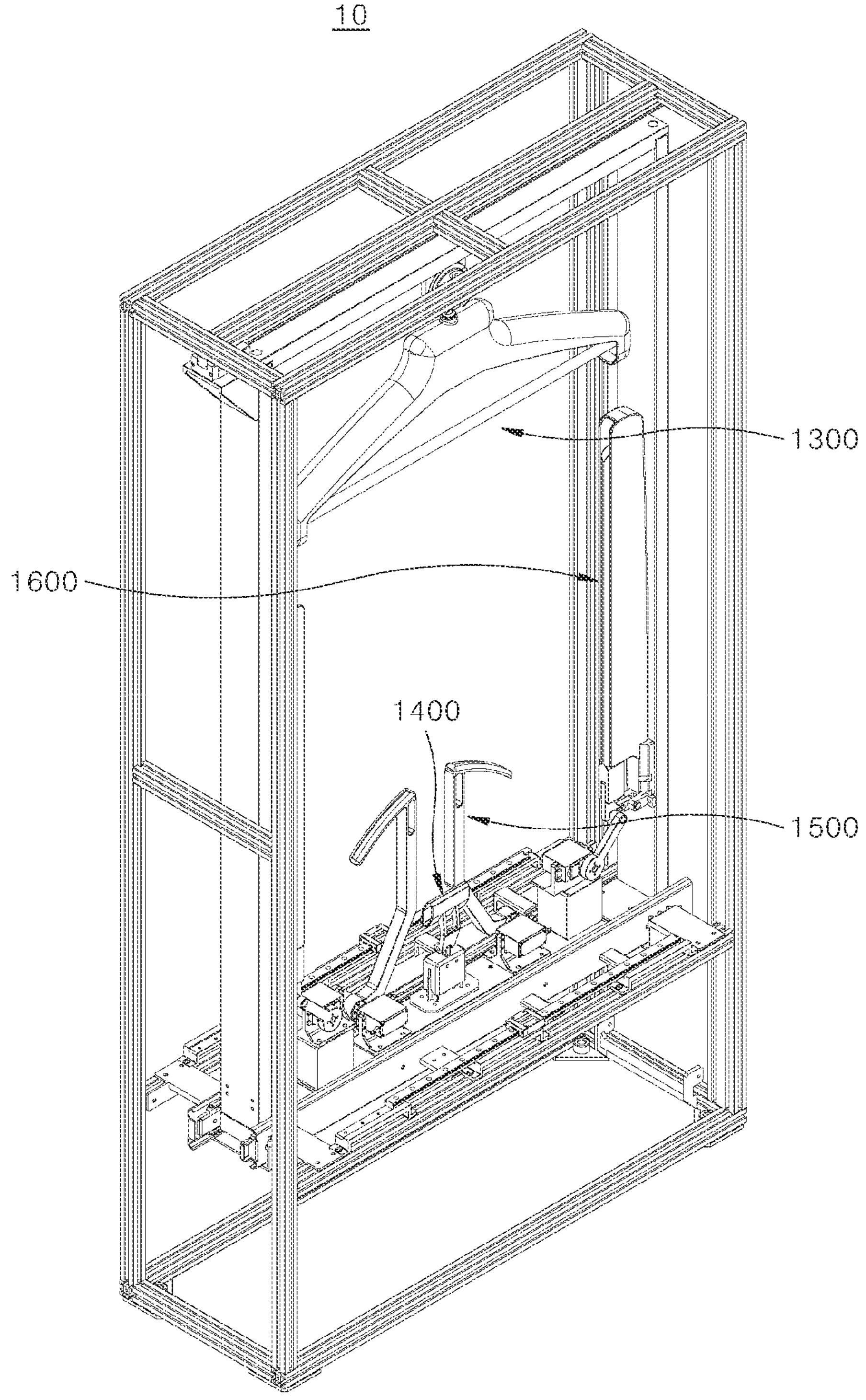

[FIG. 17]
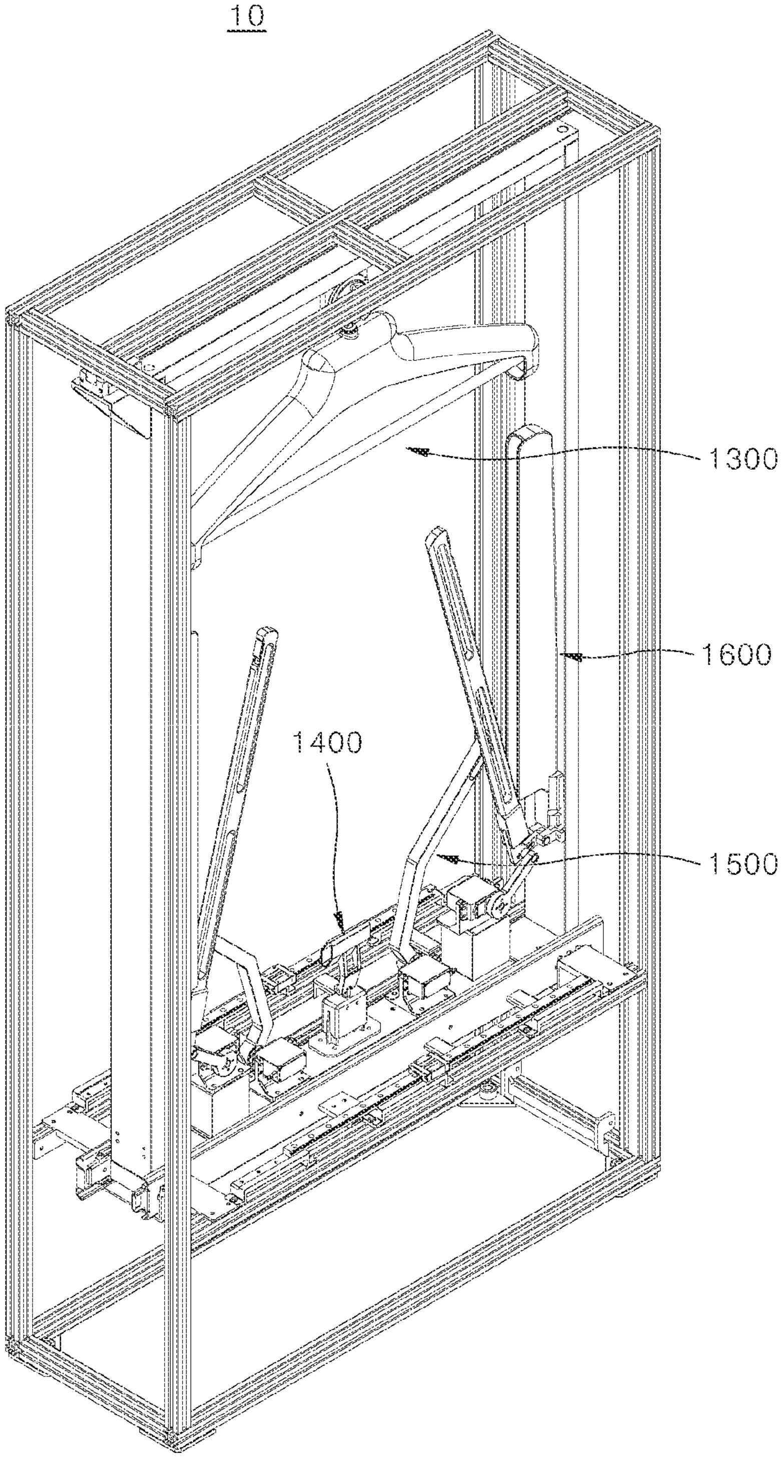

[FIG. 18]
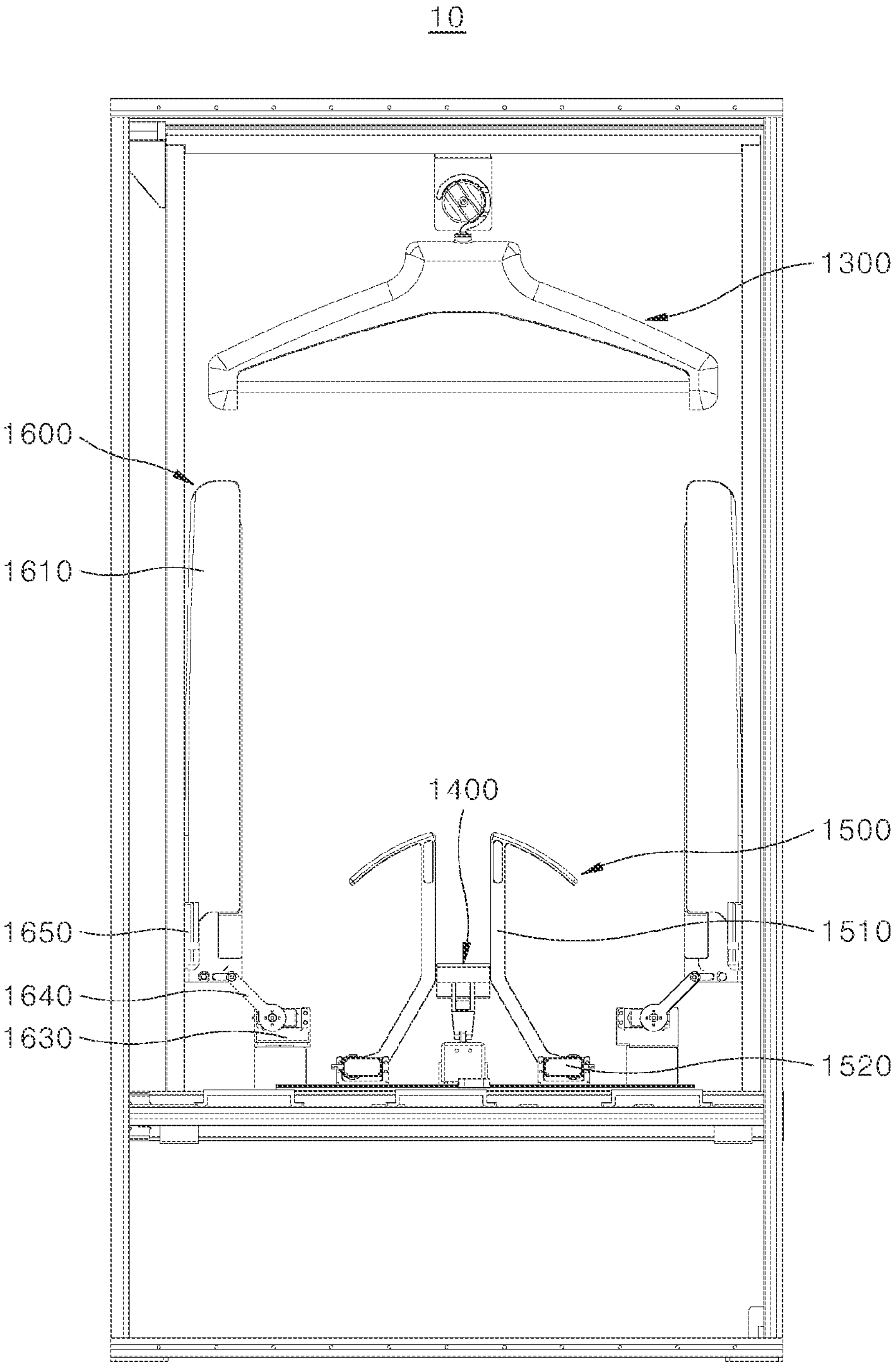

[FIG. 19]
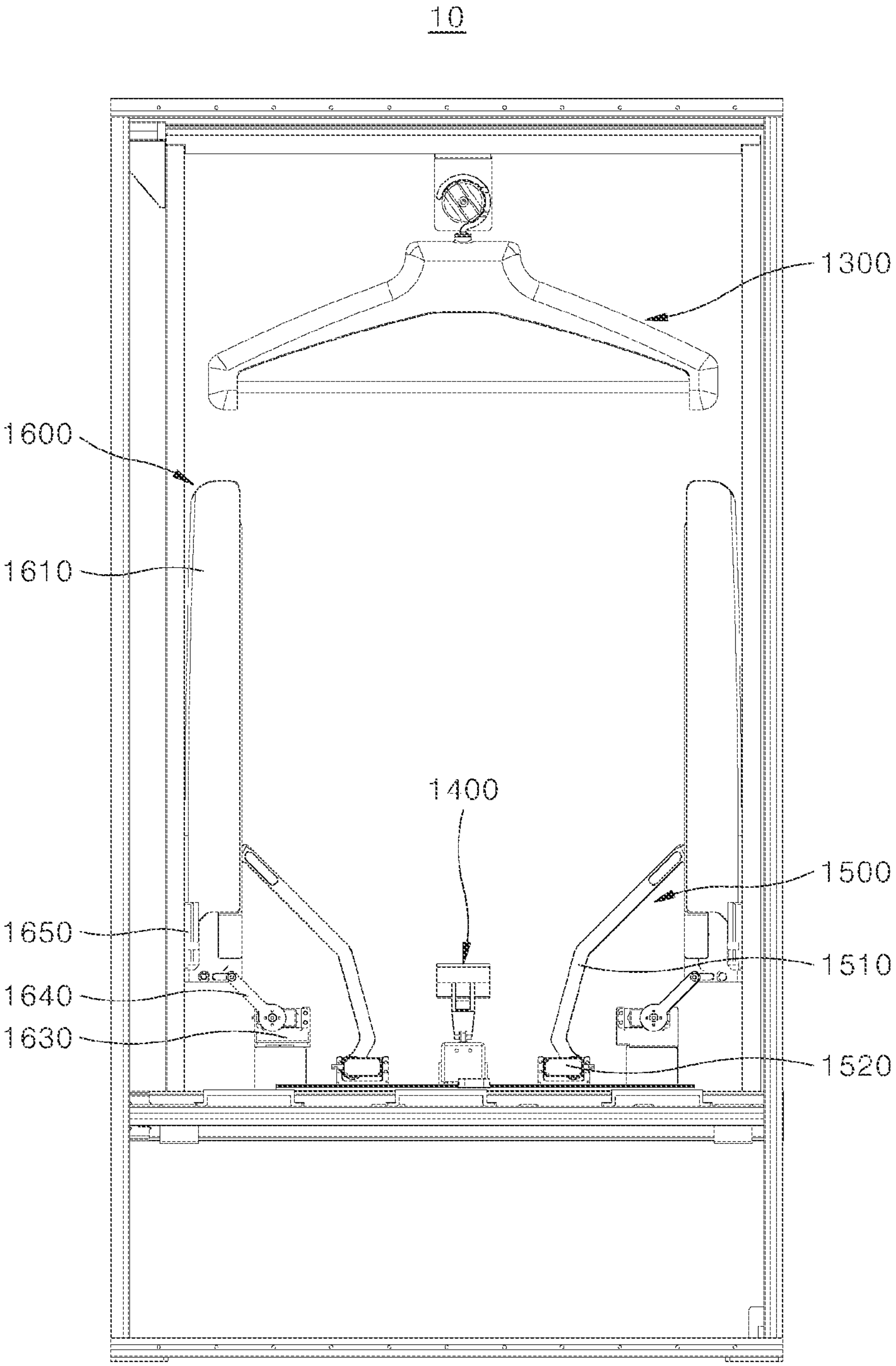

[FIG. 20]
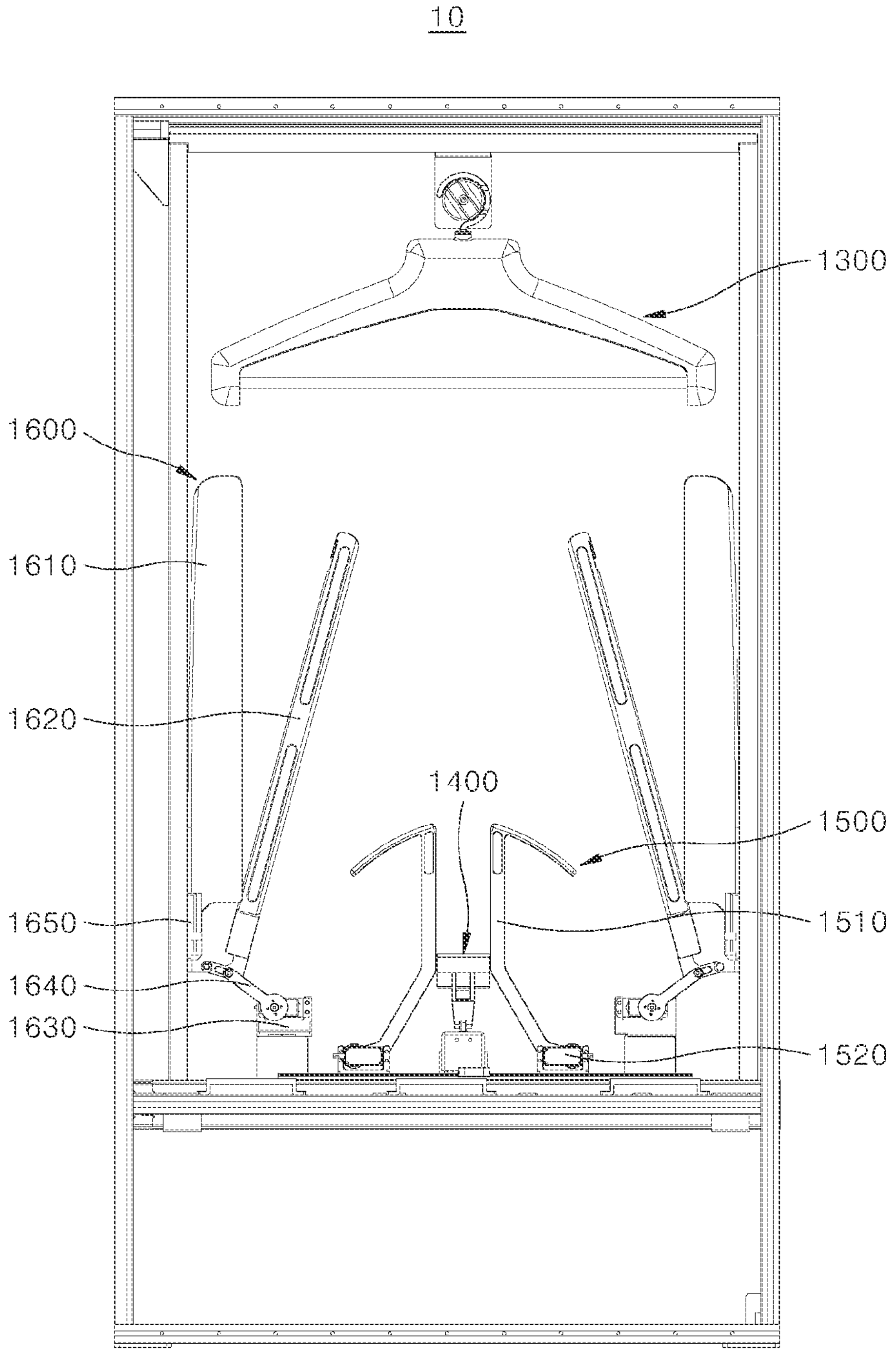

[FIG. 21]
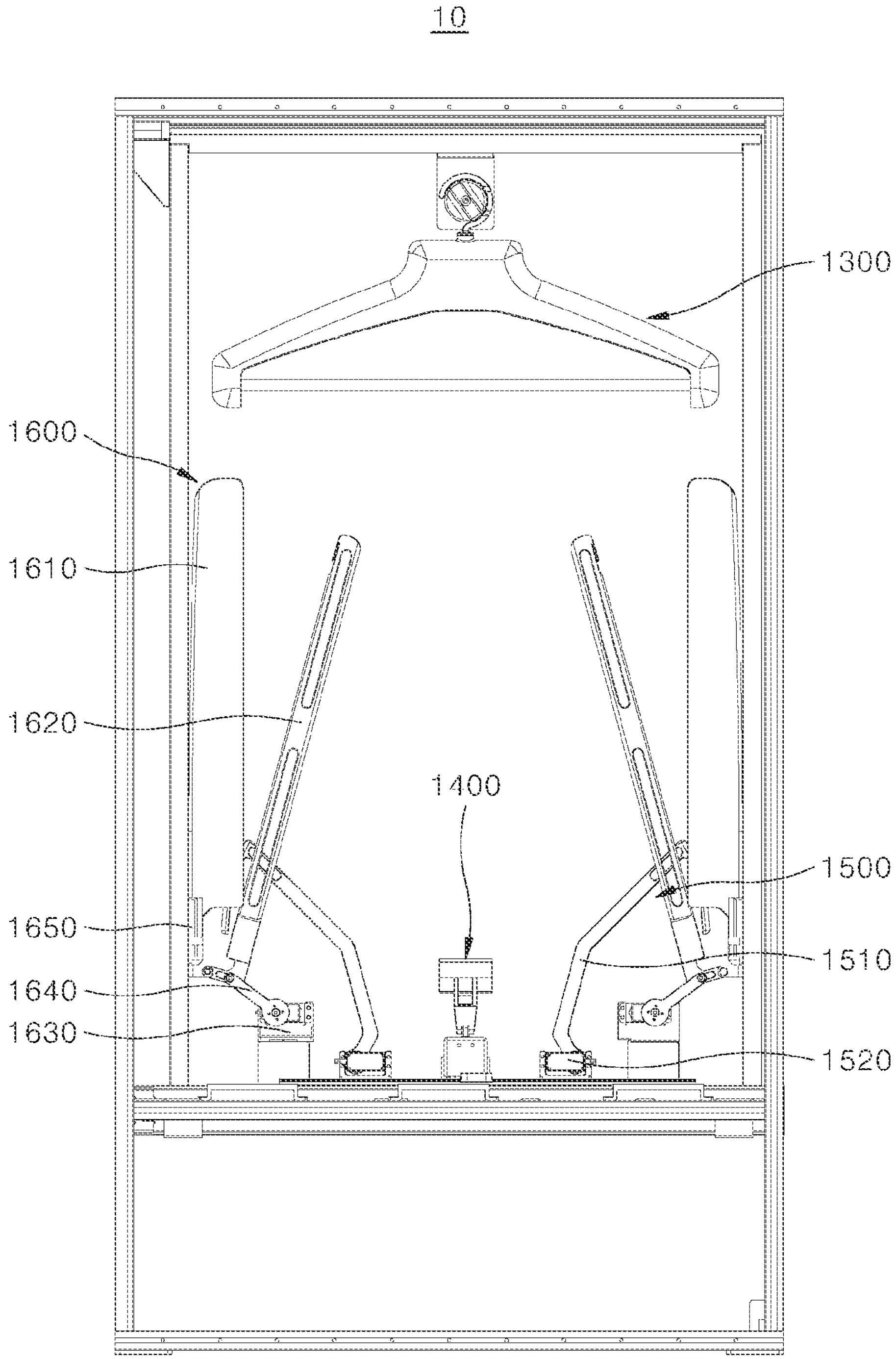

[FIG. 22]
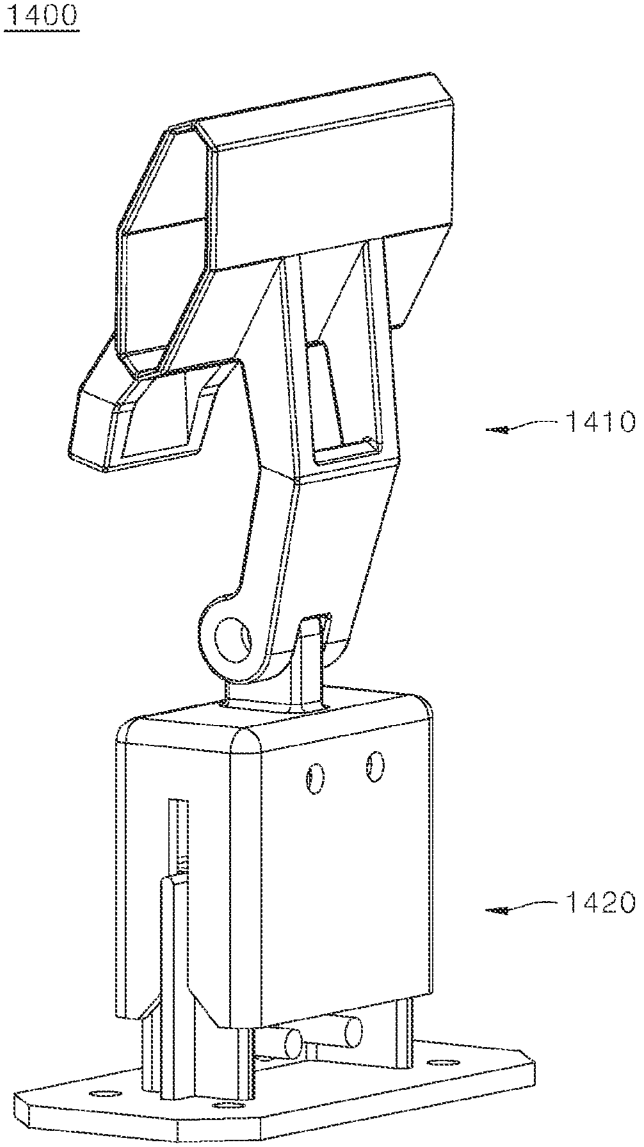

[FIG. 23]
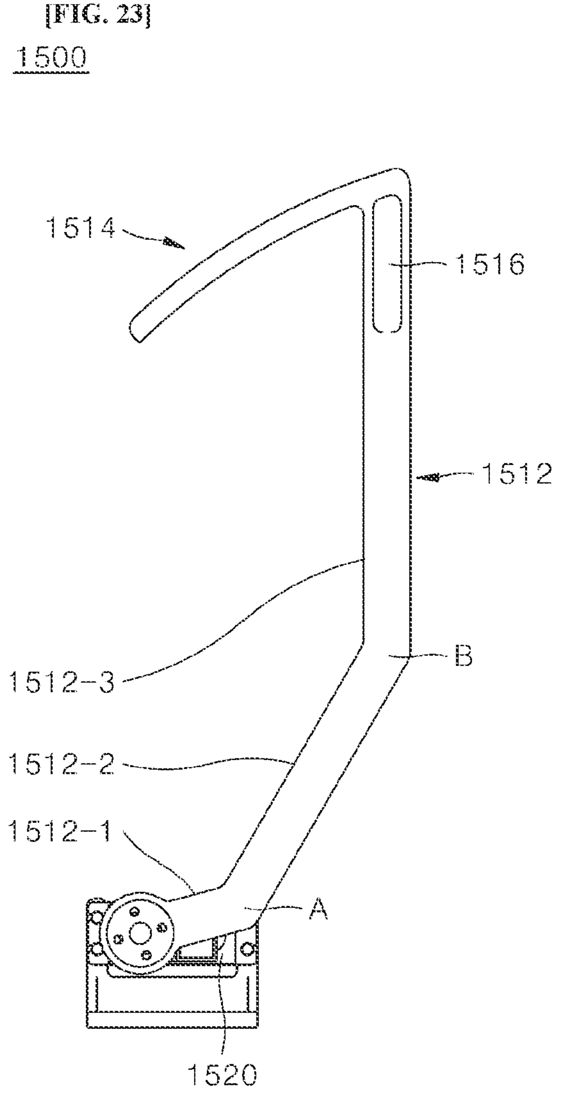

[FIG. 24]
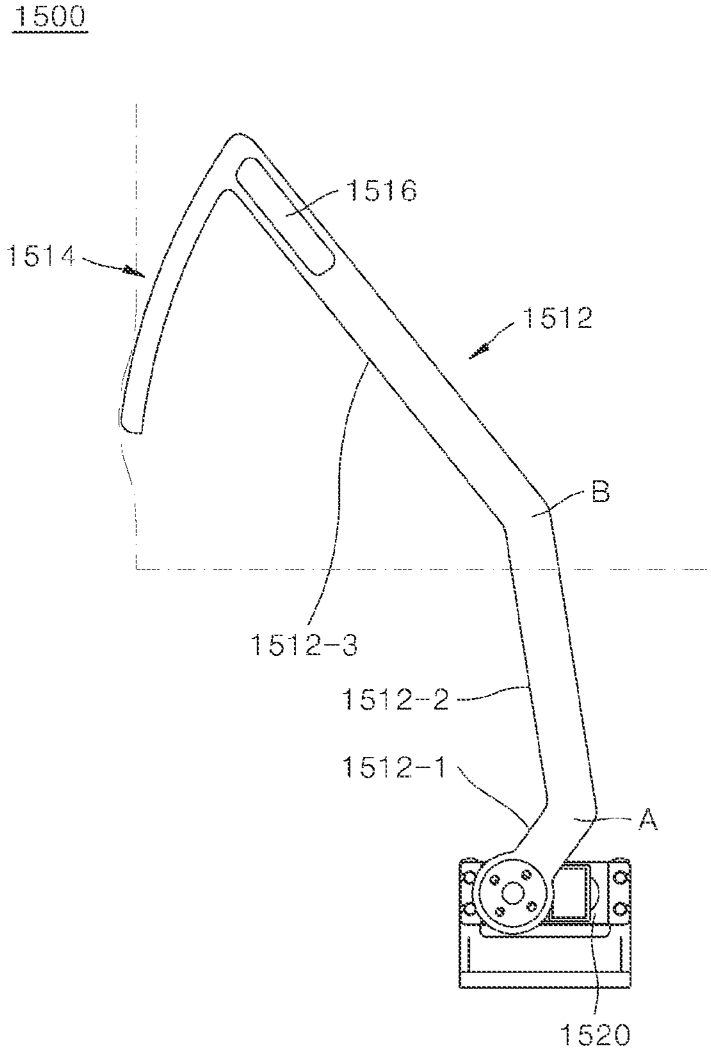

[FIG. 25]
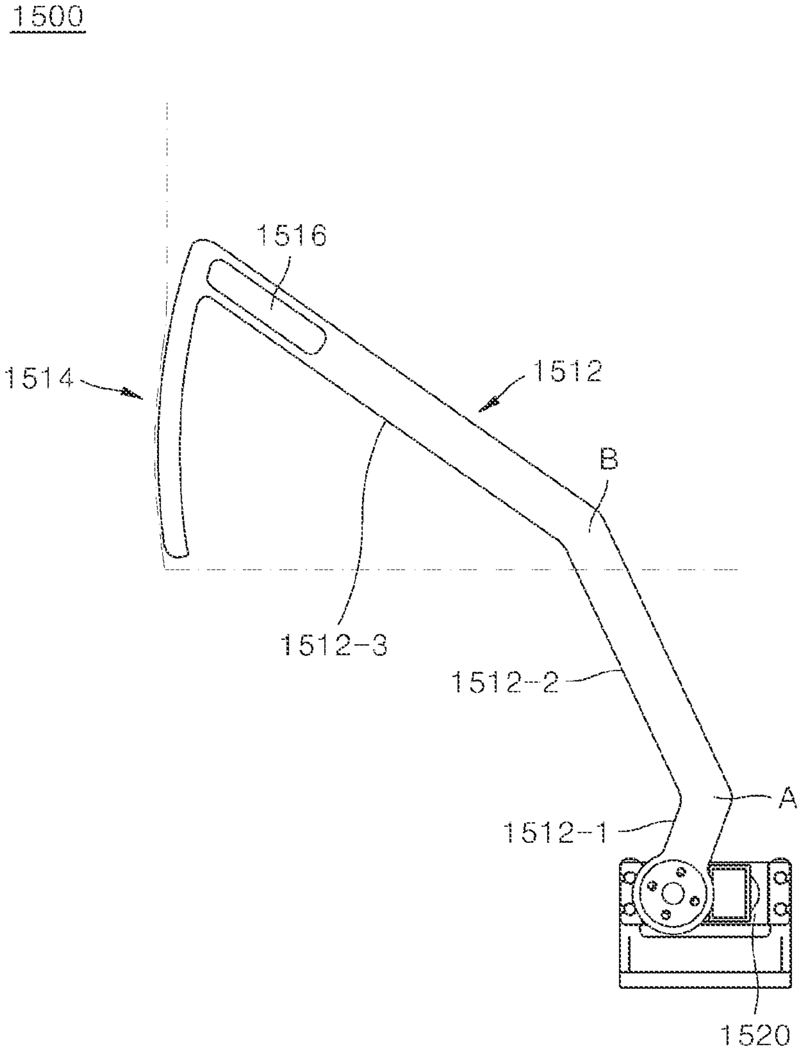

[FIG. 26]
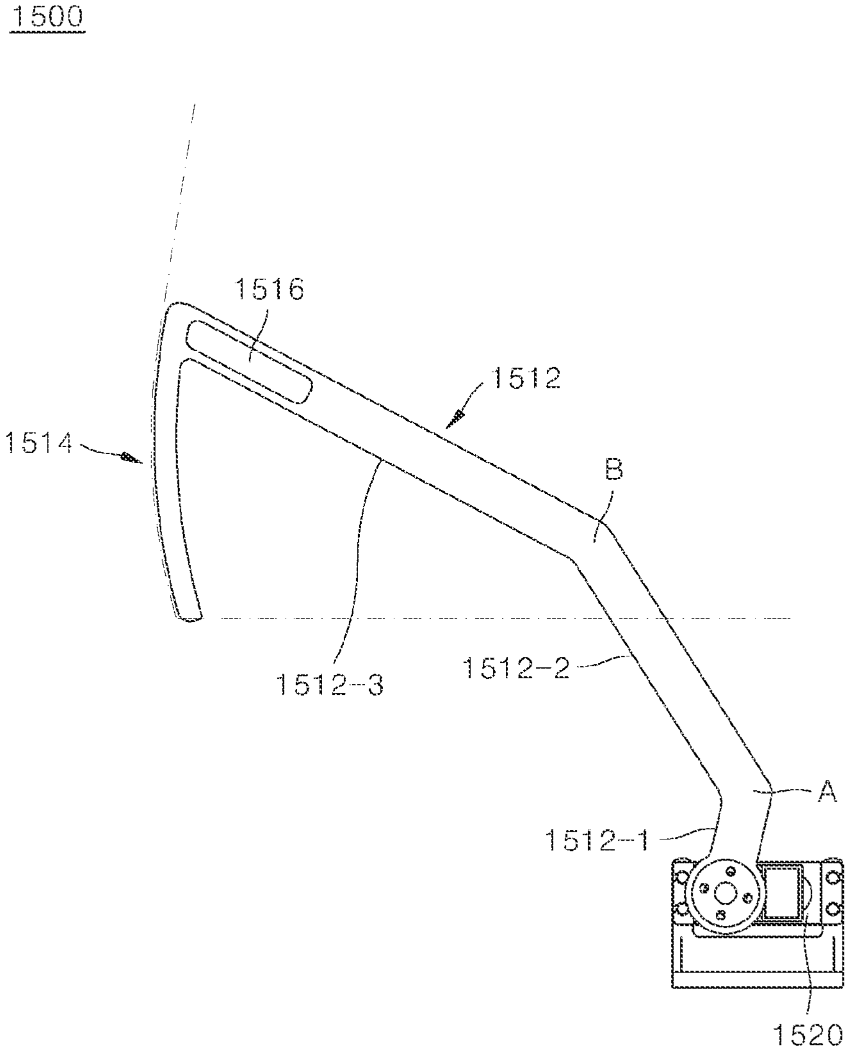

[FIG. 27]
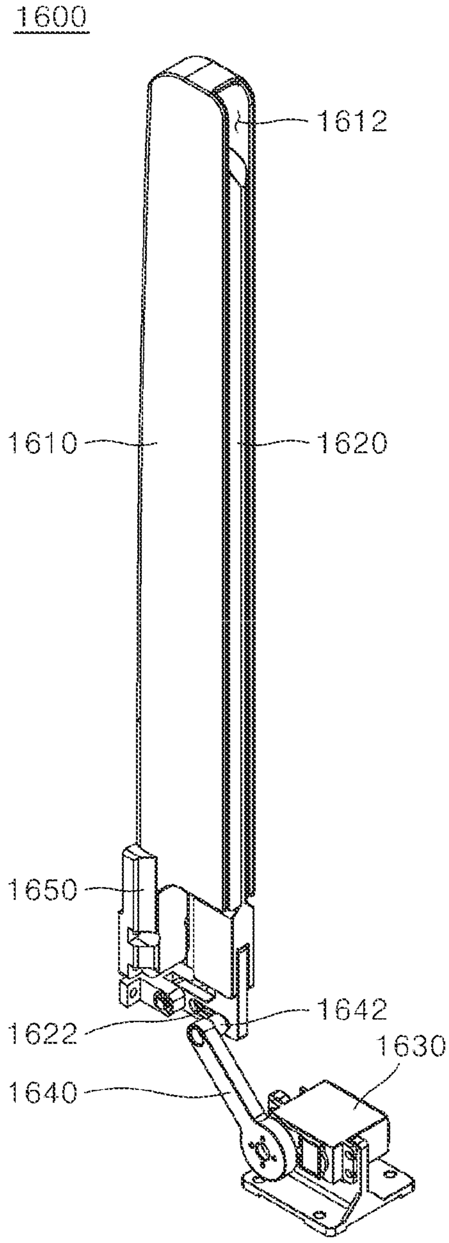

[FIG. 28]
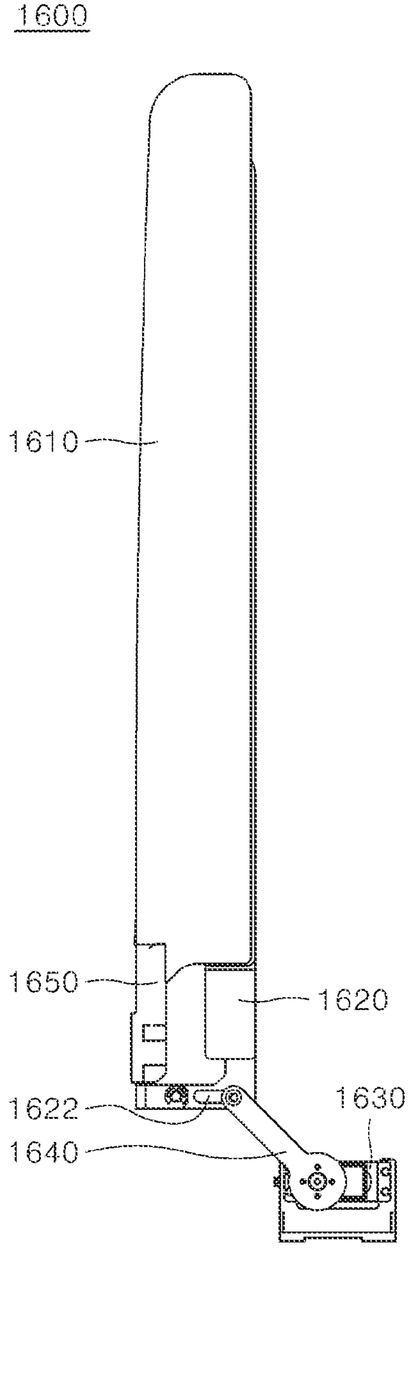

[FIG. 29]
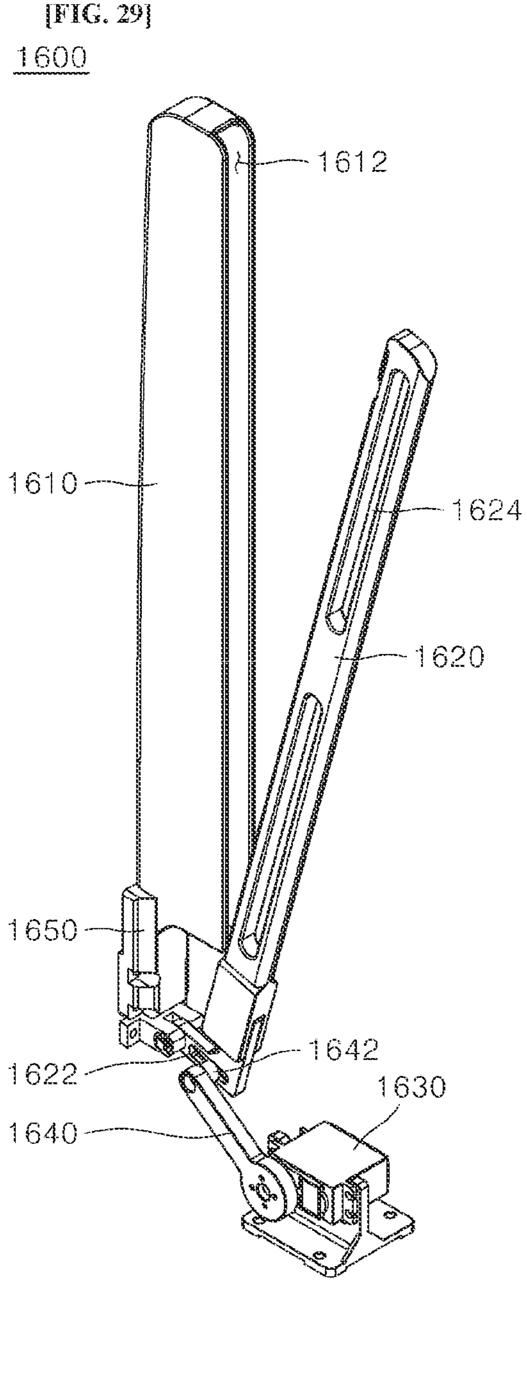

[FIG. 30]
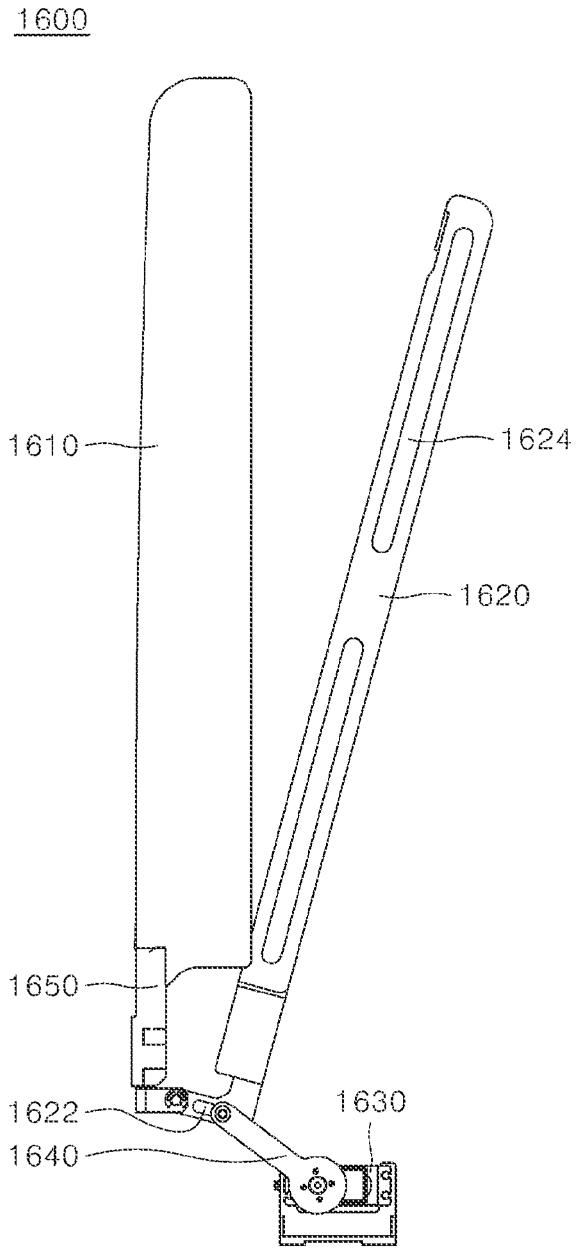

[FIG. 31]
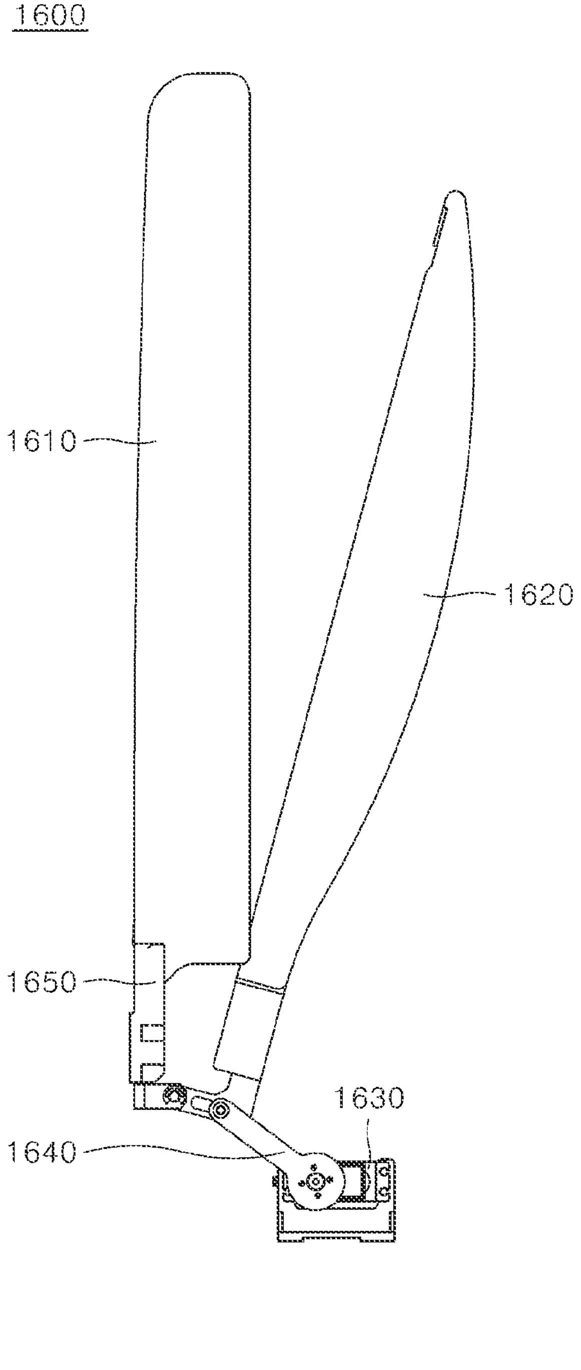

[FIG. 32]
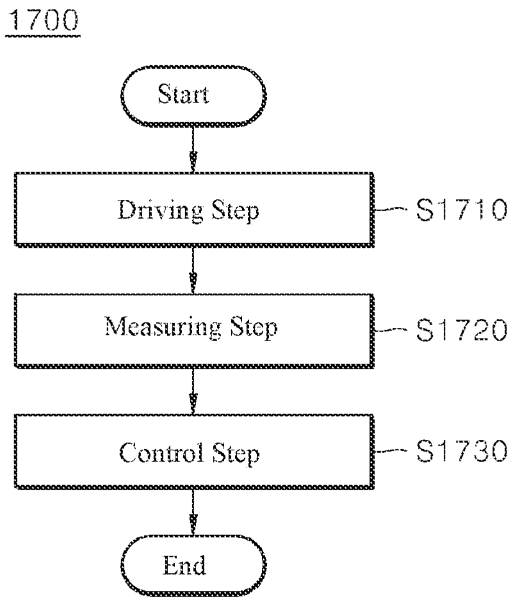

CLOTHING TREATMENT APPARATUS AND METHOD FOR CONTROLLING SAME

CROSS-REFERENCE TO RELATED APPLICATIONS

This application is a National Stage application under 35 U.S.C. § 371 of International Application No. PCT/KR2021/000149, filed on Jan. 6, 2021, which claims the benefit of Korean Patent Application No. 10-2020-0005537, filed on Jan. 15, 2020, Korean Patent Application No. 10-2020-0006070, filed on Jan. 16, 2020 and Korean Patent Application No. 10-2020-0010010, filed on Jan. 28, 2020. The disclosures of the prior applications are incorporated by reference in their entirety.

TECHNICAL FIELD

The present invention relates to a clothing treatment apparatus and a method of controlling the same and, more particularly, to a clothing treatment apparatus, which has improved clothing treatment performance such as wrinkle removal, a reduced clothing treatment time, and improved durability and coupling force of a flow path member although the flow path member is deformed due to a movement of a spray apparatus, and which constantly maintains spray pressure of the spray apparatus, prevents condensed water from being generated within the flow path member, and easily, effectively, and stably spread a body part or sleeve part of clothing at a low cost, and a method of controlling the same.

BACKGROUND ART

Recently, clothing treatment apparatuses having a function, such as removing the wrinkle of clothing or removing the dust or smell of clothing, without a separate laundry process are being used as an apparatus for conveniently treating or managing clothing.

A prior art related thereto is as follows.

Korean Patent Application Publication No. 10-2011-0099914 (hereinafter Patent Document 1) relates to a clothing treatment apparatus that includes a cabinet having an accommodation space in which clothing is accommodated, a steam generation apparatus which generates steam supplied to the accommodation space, a hot air generation apparatus which generates hot air supplied to the accommodation space, a first nozzle apparatus which supplies the accommodation space with at least one of the steam and the hot air generated by the steam generation apparatus and the hot air generation apparatus and which is fixed into the accommodation space, and a second nozzle apparatus which supplies the accommodation space with at least one of the steam and the hot air generated by the steam generation apparatus and the hot air generation apparatus and which is movably provided within the accommodation space.

Korean Patent Application Publication No. 10-2018-0037459 (hereinafter Patent Document 2) relates to a clothing treatment apparatus that includes a case including a door, a clothing support unit which supports clothing and is disposed in the accommodation space of the case, a steam spray unit which sprays steam toward clothing, and first and second air spray units which are disposed to face each other on the basis of clothing and includes air slits for simultaneously spraying compressed air to the front and back of the clothing while simultaneously moving.

However, in Patent Document 1, since the second nozzle apparatus moves in up and down direction thereof, the steam/hot air cannot be individually sprayed onto a sleeve part and body part of clothing. Accordingly, performance, such as wrinkle removal, may be reduced and a treatment time for clothing may be increased because the steam/hot air cannot be intensively sprayed onto the sleeve part of clothing which requires a longer wrinkle removal time than that for the body part of clothing.

Furthermore, as the second nozzle apparatus is horizontally elongated, condensed water may be generated within the nozzle apparatus, and the generated condensed water may be discharged. When the condensed water is generated, a flow path may be clogged. When the generated condensed water is discharged, clothing may be damaged.

Furthermore, Patent Document 1 does not specifically disclose a flow path member (e.g., a hose) which is connected to the steam/hot air generation apparatus and a movable spray apparatus (the second nozzle apparatus) and which supplies the movable spray apparatus (the second nozzle apparatus) with steam/hot air generated by the steam/hot air generation apparatus.

Problems with the flow path member for supplying the movable spray apparatus with steam/hot air having a high temperature/high pressure are described as follows.

When the spray apparatus moves in the state in which the steam/hot air generation apparatus has been fixed and installed, the flow path member has to be also manually or automatically moved or deformed so that a connection between the steam/hot air generation apparatus and the spray apparatus is maintained. As an example in which the flow path member is manually moved or deformed, if the flow path member is made of a flexible material, when the spray apparatus moves, the flow path member may also move along with the spray apparatus because an external force acts on the end of the flow path member coupled with the spray apparatus. The remaining part of the flow path member may be bent or spread in response to a movement of the end.

When the flow path member is moved or deformed in response to a movement of the spray apparatus, the flow path member may be damaged or decoupled from the spray apparatus, etc. because a force, such as tension or stress, acts on the flow path member. For example, the flow path member may be damaged or decoupled because a force acts on an end (a point at which the flow path member is connected to the spray apparatus) or a bent (a point at which the flow path member is deformed and bent) of the flow path member.

Furthermore, when steam/hot air having a high temperature/high pressure flows into the flow path member, the flow path member may be easily damaged or decoupled because high pressure is applied to the end, the bent, etc. of the flow path member.

Furthermore, when the flow path member is deformed and a shape (e.g., a bent shape) of the flow path member is changed in response to a movement of the spray apparatus, spray pressure of the spray apparatus may be greatly changed, and condensed water may be easily generated within the flow path member. When the spray pressure of the spray apparatus is changed, for example, the wrinkle of clothing may not be properly spread or clothing may be greatly damaged. When condensed water is generated within the flow path member, clothing, for example, may be greatly damaged because a flow path is clogged and condensed water is sprayed.

In Patent Document 2, since clothing is spread by only the clothing support unit having a hanger form, a sufficient tensile force is not applied to a body part or sleeve part of clothing in up and down direction or a horizontal direction thereof, and thus clothing is not sufficiently spread. Accordingly, as steam is not uniformly sprayed onto clothing, clothing treatment performance, such as wrinkle removal, may be significantly reduced.

DISCLOSURE

Technical Problem

An object of the present disclosure is to provide a clothing treatment apparatus having improved clothing treatment performance, such as wrinkle removal, and a reduced clothing treatment time.

Furthermore, an object of the present disclosure is to provide a clothing treatment apparatus which prevents condensed water from being discharged.

Furthermore, an object of the present disclosure is to provide a clothing treatment apparatus having improved durability and stability.

Furthermore, an object of the present disclosure is to provide a clothing treatment apparatus in which a heated fluid is uniformly sprayed at high pressure.

Furthermore, an object of the present disclosure is to provide a clothing treatment apparatus in which vibration or noise is reduced when a movable spray part moves.

Furthermore, an object of the present disclosure is to provide a clothing treatment apparatus in which the number of driving motors is minimized.

Furthermore, an object of the present disclosure is to provide a clothing treatment apparatus which prevents condensed water from being generated.

Furthermore, an object of the present disclosure is to provide a clothing treatment apparatus which facilitates a movement of the movable spray part.

Furthermore, an object of the present disclosure is to provide a clothing treatment apparatus, which improves the durability and coupling force of a flow path member although the flow path member is deformed due to a movement of a spray apparatus, constantly maintains spray pressure of the spray apparatus, and prevents condensed water from being generated within the flow path member by controlling a bending angle of the flow path member.

Furthermore, an object of the present disclosure is to provide a clothing treatment apparatus in which an installation space of the flow path member is minimized.

Furthermore, an object of the present disclosure is to provide a clothing treatment apparatus in which the flow path member is stably deformed in a simple and constant form.

Furthermore, an object of the present disclosure is to provide a clothing treatment apparatus in which a straight-line section in the flow path member is maximized.

Furthermore, an object of the present disclosure is to provide a clothing treatment apparatus which easily controls the bending angle of the flow path member at a low cost through a simple configuration.

Furthermore, an object of the present disclosure is to provide a clothing treatment apparatus having improved heat insulation performance.

Furthermore, an object of the present disclosure is to provide a clothing treatment apparatus which prevents a specific part of the flow path member from being intensively bent and damaged.

Furthermore, an object of the present disclosure is to provide a clothing treatment apparatus which prevents a flow path from being clogged due to condensed water or condensed water from being sprayed although the condensed water is generated within the flow path member.

Furthermore, an object of the present disclosure is to provide a clothing treatment apparatus in which the flow path members are easily and stably connected.

Furthermore, an object of the present disclosure is to provide a clothing treatment apparatus which is stably supported and also reduces noise.

Furthermore, an object of the present disclosure is to provide a clothing treatment apparatus in which a body part or sleeve part of clothing is easily, effectively, and stably spread in a diagonal or left and right direction thereof at a low cost.

Furthermore, an object of the present disclosure is to provide a clothing treatment apparatus in which fixing means for spreading a body part of clothing in up and down direction or a left and right direction thereof is minimized.

Furthermore, an object of the present disclosure is to provide a clothing treatment apparatus which is installed in a small space.

Furthermore, an object of the present disclosure is to provide a clothing treatment apparatus in which a body part of clothing is stably spread in a diagonal or left and right direction thereof due to effective friction and interference of the body part with a friction part.

Furthermore, an object of the present disclosure is to provide a clothing treatment apparatus in which a body part or sleeve part of clothing having various sizes or shapes is easily and stably spread in a diagonal or left and right direction thereof at a low cost through a simple configuration.

Furthermore, an object of the present disclosure is to provide a light clothing treatment apparatus.

Furthermore, an object of the present disclosure is to provide a clothing treatment apparatus having improved durability.

Furthermore, an object of the present disclosure is to provide a clothing treatment apparatus capable of easily fixing clothing although a front button on the clothing is not fastened.

Furthermore, an object of the present disclosure is to provide a clothing treatment apparatus which can easily spread clothing in up and down direction thereof at a low cost through a simple configuration.

Furthermore, an object of the present disclosure is to provide a clothing treatment apparatus in which a suitable tensile force is applied to clothing based on a size, shape, or material of the clothing.

Furthermore, an object of the present disclosure is to provide a clothing treatment apparatus capable of easily measuring a reaction force of clothing at a low cost through a simple configuration.

Furthermore, an object of the present disclosure is to provide a clothing treatment apparatus capable of easily covering a sleeve spreading part with a sleeve part of clothing.

Furthermore, an object of the present disclosure is to provide a clothing treatment apparatus which prevents a driving part from being damaged by steam, etc. sprayed onto a sleeve part of clothing.

Furthermore, an object of the present disclosure is to provide a clothing treatment apparatus in which a second driving part easily and stably drives a sleeve spreading arm through a link part at a low cost through a simple configuration.

Furthermore, an object of the present disclosure is to provide a clothing treatment apparatus in which a sleeve part of clothing is stably spread in a diagonal or left and right direction thereof due to effective friction and interference of the sleeve part with the sleeve spreading arm.

Furthermore, an object of the present disclosure is to provide a clothing treatment apparatus capable of easily and rapidly fixing a sleeve part of clothing at a low cost through a simple configuration.

Objects of the present disclosure are not limited to the aforementioned objects, and other objects and advantages of the present disclosure not described above may be understood from the following description and more evidently understood based on embodiments of the present disclosure. It may also be easily seen that the objects and advantages of the present disclosure may be realized by means written in the claims and a combination thereof.

Technical Solution

In order to solve the aforementioned objects, the present disclosure provides a clothing treatment apparatus 10 including: a heating part 100 configured to heat a fluid; a movable spray part 200 installed movably in a left and right direction thereof and configured to spray the heated fluid; a flow path member 300 connected to the heating part 100 and the movable spray part 200 and configured to supply the heated fluid to the movable spray part 200; and a driving part 400 configured to move the movable spray part 200 in the left and right direction.

In an embodiment, the movable spray part 200 is disposed above the heating part 100.

In an embodiment, the movable spray part 200 is configured to include: an inlet 210 through which the heated fluid is introduced; a plurality of spray ports 220 through which the heated fluid is sprayed; and a spray pipe 230 configured to communicate with the inlet 210, disposed in up and down direction thereof, and having the plurality of spray ports 220 formed along longitudinal direction thereof.

In an embodiment, the inlet 210 is formed in the lower part of the movable spray part 200.

In an embodiment, a lower part of the spray pipe 230 that communicates with the inlet 210 is formed to be inclined downward.

In an embodiment, the movable spray part 200 is configured to include the plurality of spray pipes 230. The plurality of spray ports 220 formed in at least two of the spray pipes 230 have different heights from each other.

In an embodiment, the movable spray part 200 is configured to include the plurality of spray pipes 230 disposed to be spaced apart from each other. A support member 240 that supports the spray pipe 230 is provided between at least two of the spray pipes 230.

In an embodiment, the support member 240 is provided in plural up and down in a way to be spaced apart from each other between the two spray pipes 230.

In an embodiment, the driving part 400 is coupled with a central part of the movable spray part 200, and moves the movable spray part 200 in the left and right direction.

In an embodiment, the clothing treatment apparatus 10 further includes a first guide part 500 disposed around the central part of the movable spray part 200. The driving part 400 is coupled with the central part of the movable spray part 200 and the first guide part 500, and moves the movable spray part 200 in the left and right direction.

In an embodiment, the clothing treatment apparatus 10 further includes a first guide part 500 disposed around the central part of the movable spray part 200. The first guide part 500 is configured to include a first guide rail 510 and a first guide coupling part 520 slidably coupled along the first guide rail 510.

The driving part 400 is coupled with the central part of the movable spray part 200 and the first guide coupling part 520, and moves the movable spray part 200 in the left and right direction.

In an embodiment, the clothing treatment apparatus 10 further includes one or more guide parts 600 or/and 700 disposed around at least any one of the upper and lower parts of the movable spray part 200. The one or more guide parts 600 or/and 700 are configured to include one or more guide rails 610 or/and 710. The movable spray part 200 is coupled with the one or more guide rails 610 or/and 710, and slides along the one or more guide rails 610 or/and 710.

In an embodiment, the clothing treatment apparatus 10 further includes a guide part 600 disposed around the upper part of the movable spray part 200. The guide part 600 is configured to include a guide rail 610. The movable spray part 200 is coupled with the guide rail 610, and slides along the guide rail 610.

In an embodiment, the clothing treatment apparatus 10 further includes a guide part 700 disposed around the upper part of the movable spray part 200. The guide part 700 is configured to include a guide rail 710. The movable spray part 200 is coupled with the guide rail 710, and slides along the guide rail 710.

In an embodiment, the outside of the movable spray part 200 is coated with an insulator.

In an embodiment, the movable spray part 200 is provided in plural, and the plurality of movable spray parts 200 are installed in a way to be spaced apart from each other in forward and backward direction. The clothing treatment apparatus 10 further includes a controller configured to individually control movements of the plurality of movable spray parts 200.

In order to solve the aforementioned objects, the present disclosure provides a clothing treatment apparatus 10 including: a heating part 100 configured to heat a fluid; a movable spray part 200 installed movably in a constant direction and configured to spray the heated fluid; and a flow path member 300 connected to the heating part 100 and the movable spray part 200 and bent or spread at an angle having a specific range for each unit member 310 in response to a movement of the movable spray part 200.

The heated fluid is supplied to the movable spray part 200 through the flow path member 300.

In an embodiment, a maximum angle at which the unit member 310 is bent in one direction is greater than a maximum angle at which the unit member 310 is bent in the other direction on the basis of the state in which the flow path member 300 has been spread.

In an embodiment, the flow path member 300 is bent only in one direction on the basis of the state in which the flow path member 300 has been spread.

In an embodiment, the flow path member 300 is bent on one side S, and thus one part P thereof is overturned. An end E1 of the overturned one part P is coupled with the movable spray part 200.

In an embodiment, the movable spray part 200 moves in the left and right direction, and the flow path member 300 is disposed in the left and right direction.

In an embodiment, the flow path member 300 is overturned on the one side S, and thus one part P thereof is turned upside down. The one part P that has been turned upside down is disposed above the other part of the flow path member 300. An end E1 of the one part P is coupled with the movable spray part 200.

In an embodiment, when the one part P is spread on the basis of the end E1, the end E1 is coupled with the movable spray part 200 so that the one part P is downward inclined toward the one side S or forms horizontality.

In an embodiment, the movable spray part 200 is coupled with a protruded part 730 that protrudes at a slope at which the protruded part 730 is downward inclined toward the one side S or that forms horizontality, and the movable spray part 200 moves therewith. The end E1 is coupled with the protruded part 730.

In an embodiment, the clothing treatment apparatus 10 further includes a support part 1100 disposed under the flow path member 300 and configured to support the flow path member 300. The support part 1100 is configured to include a plurality of supports 1110 disposed in a way to be spaced apart from each other in the left and right direction.

In an embodiment, an upper cross section of each of the supports 1110 is convexly formed in a streamlined shape.

In an embodiment, the clothing treatment apparatus 10 further includes a second flow path pipe 900 having one end that communicates with the other end E2 of the flow path member 300 that is opposite to one end E1 of the flow path member 300 coupled with the movable spray part 200, and the other end connected to the heating part 100.

In an embodiment, at least a part of the second flow path pipe 900 is fixedly installed.

In an embodiment, the second flow path pipe 900, the flow path member 300, and the movable spray part 200 are each provided in plural. The second flow path pipe 900, the flow path member 300, and the movable spray part 200 communicate with each other.

In an embodiment, the clothing treatment apparatus 10 further includes a third flow path pipe 1000 having one end that communicates with the other ends of the plurality of second flow path pipes 900, and the other end connected to the heating part 100.

In an embodiment, the flow path member 300 is configured to include a chain bent at an angle having a specific range for each unit chain 310*a* and a first flow path pipe 350 that is disposed in parallel with the chain in the longitudinal direction of the chain to follow the bending of the chain and that is flexible.

In an embodiment, the first flow path pipe 350 is disposed inside the chain, and the outside of the chain is coated with an insulator.

In order to solve the aforementioned objects, the present disclosure provides a clothing treatment apparatus 10 including: an upper support part 1300 configured to support the upper part of clothing; and a body spreading part 1500 disposed below the upper support part 1300 and configured to spread a body part of the clothing.

The body spreading part 1500 is configured to include: a body spreading arm 1510 having at least a part disposed inside the body part and configured to rotate by using one end thereof as a rotation axis; and a first driving part 1520 configured to rotate the body spreading arm 1510.

In an embodiment, the body spreading arm 1510 is configured to include: a support part 1512 having one end coupled with the first driving part 1520 and to rotate; and a friction part 1514 coupled with the support part 1512, supported by the support part 1512, and subjected to friction and interference with one side of the inside of the body part.

In an embodiment, the friction part 1514 is slantly coupled with the support part 1512.

In an embodiment, the friction part 1514 is disposed in a rotational direction toward one side of the inside of the body part and is disposed to be inclined inwardly and slantly toward the rotation axis.

In an embodiment, an outside of the friction part 1514, which is subjected to friction and interference with one side of the inside of the body part, is formed to protrude.

In an embodiment, a friction material is provided on the outside of the friction part 1514, which is subjected to friction and interference with one side of the inside of the body part.

In an embodiment, one end of the friction part 1514 is formed to protrude in the direction in which the friction part 1514 is rotated toward one side of the inside of the body part.

In an embodiment, the friction part 1514 is coupled with the other end of the support part 1512, and has a first through hole 1516 formed in the other end of the support part 1512.

In an embodiment, the support part 1512 is formed to be bent in a direction in which the support part 1512 is rotated toward one side of the inside of the body part.

In an embodiment, the support part 1512 is bent at n locations and is formed to be bent in an arch shape.

In an embodiment, the length of a first section including the rotation axis among (n+1) sections divided by the n locations is smaller than a value obtained by dividing a total length of the (n+1) sections of the support part 1512 by n+1.

In an embodiment, the length of the section is gradually increased from the first section toward a section coupled with the friction part 1514.

In an embodiment, the body spreading part 1500 is configured to include a left body spreading part disposed on the left of the body part and a right body spreading part disposed on the right of the body part. Each of the left body spreading part and the right body spreading part includes the body spreading arm 1510 and the first driving part 1520.

In an embodiment, the clothing treatment apparatus 10 further includes a body fixing part 1400 disposed below a central part of the upper support part 1300. The body fixing part 1400 is configured to include: a body binding clip 1410 installed toward the body part; and a flexible part 1420 coupled with the body binding clip 1410 and installed in a way to be flexible up and down.

In an embodiment, the flexible part 1420 is configured to include an elastic body that is elastically deformed and upward extended. The body binding clip 1410 is connected to the elastic body.

In an embodiment, the clothing treatment apparatus 10 further includes: a measuring part configured to measure a reaction force of clothing that acts on the body spreading arm 1510; and a controller configured to control the rotation of the first driving part 1520 based on a measured value of the measuring part.

In an embodiment, the measuring part measures the reaction force based on a change of current applied to the first driving part 1520.

In order to solve the aforementioned objects, the present disclosure provides a clothing treatment apparatus 10 including: an upper support part 1300 configured to support an upper part of clothing; and sleeve spreading parts 1600 disposed below the upper support part 1300 and configured to spread sleeve parts of the clothing.

The sleeve spreading part 1600 is configured to include: a fixing part 1610 having at least a part disposed inside the sleeve part in up and down direction thereof; a sleeve spreading arm 1620 having at least a part disposed inside the sleeve part, configured to rotate by using one end thereof as a rotation axis, and subjected to friction and interference with one side of the inside of the sleeve part; and a second driving part 1630 configured to rotate the sleeve spreading arm 1620.

In an embodiment, the fixing part 1610 includes an accommodation part 1612 configured to accommodate the sleeve spreading arm 1620.

In an embodiment, the sleeve spreading arm 1620 is rotated toward a central part of the body part of the clothing, and is subjected to friction and interference with one side of the inside of the sleeve part.

In an embodiment, the sleeve spreading part 1600 further includes a link part 1640 configured to rotate by using, as a rotation axis, one end thereof coupled with the second driving part 1630. The sleeve spreading arm 1620 is coupled with the other end of the link part 1640. The sleeve spreading arm 1620 is rotated in response to the rotation of the link part 1640.

In an embodiment, a sliding hole 1622 is formed in one side of the sleeve spreading arm 1620. A protruded part 1642 that penetrates the sliding hole 1622 and slides and moves along the sliding hole 1622 is provided at the other end of the link part 1640.

In an embodiment, an outside of the sleeve spreading arm 1620, which is subjected to friction and interference with one side of the inside of the sleeve part, is formed to protrude.

In an embodiment, a second through hole 1624 is formed in the sleeve spreading arm 1620.

In an embodiment, a sleeve binding clip 1650 that comes into contact with one surface of the fixing part 1610 is provided at the lower part of the fixing part 1610.

In order to solve the aforementioned objects, the present disclosure provides a method 1700 of controlling the clothing treatment apparatus, including: a driving step S1710 of the body spreading arm 1510 being rotated by the first driving part 1520 and subjected to friction and interference with one side of the inside of the body part; a measuring step S1720 of measuring a reaction force of the clothing that acts on the body spreading arm 1510; and a control step S1730 of controlling the rotation of the first driving part 1520 based on a measured value measured in the measuring step S1720.

In order to solve the aforementioned objects, the present disclosure provides a method 1700 of controlling the clothing treatment apparatus, including: a driving step S1710 of the sleeve spreading arm 1620 being rotated by the second driving part 1630 and subjected to friction and interference with one side of the inside of the sleeve part; a measuring step S1720 of measuring a reaction force of the clothing that acts on the sleeve spreading arm 1620; and a control step S1730 of controlling the rotation of the second driving part 1630 based on a measured value measured in the measuring step S1720.

Advantageous Effects

According to embodiments of the present disclosure, the movable spray part 200 is coupled with the driving part 400, and may spray a heated fluid while moving in the left and right direction. Accordingly, clothing treatment performance, such as wrinkle removal, can be improved and a clothing treatment time can be reduced because the heated fluid can be individually sprayed onto a sleeve part and body part of clothing.

According to embodiments of the present disclosure, the movable spray part 200 may be disposed above the heating part 100. Accordingly, condensed water can be prevented from being discharged because the condensed water can easily flow into the heating part 100 although the condensed water is generated within the movable spray part 200.

According to embodiments of the present disclosure, the spray pipe 230 in which the plurality of spray ports 220 has been formed along longitudinal direction thereof may be disposed in up and down direction thereof. Accordingly, performance, such as wrinkle removal, can be improved and a clothing treatment time can be reduced because a heated fluid can be individually sprayed onto a sleeve part and body part of clothing.

According to embodiments of the present disclosure, the inlet 210 may be formed in the lower part of the movable spray part 200. Accordingly, condensed water can be prevented from being discharged because the condensed water can easily flow into the inlet 210 connected to the heating part 100 although the condensed water is generated within the movable spray part 200.

According to embodiments of the present disclosure, the lower part of the spray pipe 230 that communicates with the inlet 210 may be formed to be inclined downward. Accordingly, condensed water can be prevented from being discharged through the spray port 220 because the condensed water can easily flow into the inlet 210 connected to the heating part 100 although the condensed water is generated within the spray pipe 230.

According to embodiments of the present disclosure, the movable spray part 200 may be configured to include the plurality of spray pipes 230. Accordingly, the durability and stability of the movable spray part 200 can be improved.

According to embodiments of the present disclosure, the heights of the plurality of spray ports 220 formed in any one spray pipe 230 may be different from the heights of the plurality of spray ports 220 formed in another spray pipe 230. Accordingly, a heated fluid can be uniformly sprayed at high pressure although the movable spray part 200 consists of the plurality of spray pipes 230 because a total of the spray ports 220 necessary for clothing treatment can be uniformly distributed and formed in the plurality of spray pipes 230.

According to embodiments of the present disclosure, the movable spray part 200 may be configured to include the plurality of spray pipes 230 disposed to be spaced apart from each other. The support member 240 that supports the spray pipe 230 may be provided between at least two of the spray pipes 230. Accordingly, the durability and stability of the movable spray part 200 can be improved, and vibration or noise can be reduced when the movable spray part 200 is moved.

According to embodiments of the present disclosure, the support member 240 may be provided in plural, and the plurality of support members may be spaced apart from each other up and down between the two spray pipes 230 disposed to be spaced apart from each other. Accordingly, the durability and stability of the movable spray part 200 can be further improved, and vibration or noise can be further reduced when the movable spray part 200 is moved.

According to embodiments of the present disclosure, the driving part 400 may be coupled with the central part of the movable spray part 200. Accordingly, the number of driving motors 410 can be minimized, and vibration or noise can be minimized when the movable spray part 200 moves.

According to embodiments of the present disclosure, the driving part 400 may be coupled with the central part of the movable spray part 200 and the first guide coupling part 520, and can move the movable spray part 200 in the left and right direction. Accordingly, a movement of the movable spray part 200 can be facilitated and vibration or noise can be reduced when the movable spray part 200 moves because the movable spray part 200 can be supported and guided by the first guide part 500 as well as the driving part 400.

According to embodiments of the present disclosure, one or more guide rails 610 or/and 710 may be disposed around at least any one of the upper and lower parts of the movable spray part 200, and the movable spray part 200 may be coupled with the one or more guide rails 610 or/and 710 and may slidably move along the one or more guide rails 610 or/and 710. Accordingly, a movement of the movable spray part 200 can be facilitated and vibration or noise can be reduced when the movable spray part 200 moves because the movable spray part 200 can be supported and guided by the second guide part 600 or the third guide part 700.

According to embodiments of the present disclosure, the outside of the movable spray part 200 may be coated with an insulator. Accordingly, condensed water can be prevented from being generated within the movable spray part 200.

According to embodiments of the present disclosure, the movable spray part 200 may be installed in plural, and the plurality of movable spray parts 200 may be spaced apart from each other in forward and backward direction. Accordingly, clothing can be rapidly and easily treated because the movable spray part 200 can simultaneously spray a heated fluid to the front and back of clothing.

According to embodiments of the present disclosure, the controller 800 may individually control movements of the plurality of movable spray parts 200 that are installed in a way to be spaced apart from each other in the forward and backward direction. Accordingly, clothing treatment performance, such as wrinkle removal, and efficiency can be improved and a clothing treatment time can be reduced because a heated fluid can be sprayed at an optimal location before and after clothing based on a shape, size, or material of clothing or characteristics for each portion of clothing.

According to embodiments of the present disclosure, the flow path member 300 connected to the heating part 100 and the movable spray part 200 may be bent or spread at an angle having a specific range for each unit member 310 in response to a movement of the movable spray part 200. Accordingly, spray pressure of the movable spray part 200 can be constantly maintained because the flow path member 300 is bent in a constant form, not an arbitrary form, and an installation space of the flow path member 300 can be minimized because a movement/deformation space of the flow path member 300 is constant. Furthermore, the flow path member 300 may be bent in a simple form. Accordingly, a flow path can be prevented from being clogged by condensed water or condensed water can be prevented from being sprayed because the condensed water is prevented from being generated within the flow path member 300. Furthermore, as the flow path member 300 is gently bent in a simple form, damage to the flow path member 300 or decoupling from the movable spray part 200, etc. attributable to an increase in pressure can be suppressed although a fluid having a high temperature/high pressure flows. Accordingly, the durability and coupling force of the flow path member 300 can be easily improved at a low cost.

According to embodiments of the present disclosure, a maximum angle at which the unit member 310 is bent in one direction may be greater than a maximum angle at which the unit member 310 is bent in the other direction on the basis of the state in which the flow path member 300 has been spread. Accordingly, the flow path member 300 can be stably deformed in a simple and constant form because the flow path member 300 is biased and bent in one direction.

According to embodiments of the present disclosure, the flow path member 300 may be bent only in one direction on the basis of the state in which the flow path member 300 has been spread. Accordingly, the flow path member 300 can be stably deformed in a simpler and constant form, and a straight-line section can be maximized in the flow path member 300. Accordingly, the durability of the flow path member 300 can be easily improved at a low cost and a coupling force with the movable spray part 200, etc. can be improved because a fluid having a high temperature/high pressure can more easily flow.

According to embodiments of the present disclosure, the flow path member 300 may be bent on the one side S, and the one part P thereof may be overturned. The end E1 of the overturned one part P may be coupled with the movable spray part 200. Accordingly, the flow path member 300 can be connected to the movable spray part 200 while being constantly deformed in a simple form in which bending is minimized, and an installation space of the flow path member 300 can be minimized. Furthermore, as a bent part of the flow path member 300 is different depending on a movement of the movable spray part 200, a specific part of the flow path member 300 can be prevented from being intensively bent and damaged.

According to embodiments of the present disclosure, the flow path member 300 may be disposed in the left and right direction along the movable spray part 200 that moves in the left and right direction, and may be bent on the one side S. The one part P of the flow path member 300 may be turned upside down, the one part P that has been turned upside down may be disposed above the other part of the flow path member 300, and the end E1 of the one part P that has been turned upside down may be coupled with the movable spray part 200. Accordingly, a flow path can be prevented from being clogged by condensed water or condensed water can be prevented from being sprayed because the condensed water does not move to the movable spray part 200 disposed above the flow path member 300 and downward flows by gravity although the condensed water is generated within the flow path member 300.

According to embodiments of the present disclosure, on the basis of the end E1 of the one part P that has been bent and overturned on the one side S of the flow path member 300, when the overturned part P is spread, the end may be coupled with the movable spray part 200 so that the overturned one part P is downward inclined toward the one side S or forms horizontality. Accordingly, a flow path can be more certainly prevented from being clogged by condensed water or condensed water can be more certainly prevented from being sprayed because the condensed water does not move to the movable spray part 200 disposed above the flow path member 300 and easily flows downward by gravity although the condensed water is generated within the flow path member 300.

According to embodiments of the present disclosure, the movable spray part 200 may be configured to include the protruded part 730 that protrudes at a slope at which the protruded part 730 is downward inclined toward the one side S or forms horizontality. The end E1 of the overturned one part P may be coupled with the protruded part 730. Accordingly, the one part P that has been overturned can be stably easily installed at the slope at which the one part P is downward inclined or forms horizontality.

According to embodiments of the present disclosure, the supports 1110 each having the upper cross section convexly formed in a streamlined shape may be disposed under the flow path member 300 in a way to be spaced apart from each other. Accordingly, the supports 1110 can stably support the flow path member 300 while minimizing the occurrence of noise.

According to embodiments of the present disclosure, at least a part of the second flow path pipe 900 that communicates with the flow path member 300 may be fixedly installed in the clothing treatment apparatus 10. Accordingly, the second flow path pipe 900 and the flow path member 300 can be stably connected, and the flow path member 300 can be easily and stably connected to the second flow path pipe 900 that has a simple structure and that has been fixedly installed without a need to be directly connected to the heating part 100. In particular, the flow path member 300 may be configured to include the chain and the first flow path pipe 350. The second flow path pipe 900 connected to the first flow path pipe 350 can be fixedly installed in the clothing treatment apparatus 10 although the first flow path pipe 350 is moved in response to a movement of the movable spray part 200 because the first flow path pipe 350 is not fixed to the chain. Accordingly, the flow path member 300 and the second flow path pipe 900 can be easily and stably connected.

According to embodiments of the present disclosure, the third flow path pipe 1000 connected to the heating part 100 may communicate with the plurality of second flow path pipes 900 that are fixedly installed in the clothing treatment apparatus 10. Accordingly, the heating part 100 and the plurality of movable spray parts 200 can be easily and stably connected. Furthermore, the second flow path pipes 900 connected to the first flow path pipes 350, respectively, may be fixedly installed in the clothing treatment apparatus 10 although the plurality of movable spray parts 200 is individually moved and thus the plurality of first flow path pipes 350 is individually moved. Accordingly, the third flow path pipe 1000 can be easily and stably connected to the plurality of second flow path pipes 900.

According to embodiments of the present disclosure, the flow path member 300 may be configured to include the chain bent at an angle having a specific range for each unit chain 310*a* and the first flow path pipe 350 that is disposed in parallel with the chain in the longitudinal direction of the chain to follow the bending of the chain and that is flexible. Accordingly, the bending angle of the flow path member can be easily controlled at a low cost through a simple configuration.

According to embodiments of the present disclosure, the first flow path pipe 350 may be disposed inside the chain, and the outside of the chain may be coated with an insulator. Accordingly, heat insulation performance can be improved because the air layer is formed between the chain and the first flow path pipe 350, and thus condensed water can be prevented from being generated.

According to embodiments of the present disclosure, the body spreading part 1500 disposed below the upper support part 1300 may be configured to include the body spreading arm 1510 and the first driving part 1520. The body spreading arm 1510 may have at least a part disposed inside the body part of clothing supported by the upper support part 1300, and may rotate by using one end thereof as a rotation axis. The first driving part 1520 may rotate the body spreading arm 1510. Accordingly, the body part of the clothing can be easily, effectively, and stably spread in a diagonal or left and right direction thereof at a low cost. Furthermore, fixing means for spreading the body part in up and down direction or a left and right direction thereof can be minimized because the body part of the clothing can be spread in the diagonal direction. Furthermore, the body spreading part 1500 can be installed in a small space because the body spreading arm 1510 can rotate on one plane and spread the clothing.

According to embodiments of the present disclosure, the friction part 1514 may be slantly coupled with the support part 1512. Accordingly, as a friction area between the friction part 1514 and one side of the inside of the body part of clothing is increased, the body part of the clothing can be effectively subjected to friction and interference with the friction part 1514, and thus can be stably spread in a diagonal or left and right direction thereof.

According to embodiments of the present disclosure, the friction part 1514 may be disposed in a rotational direction toward one side of the inside of the body part and is disposed to be inclined inwardly and slantly toward the rotation axis of the body spreading arm 1510. Accordingly, as a friction area between the friction part 1514 and the clothing is increased, the body part of the clothing can be effectively subjected to friction and interference with the friction part 1514 and can be stably spread in the diagonal or left and right direction. Furthermore, the friction part 1514 may be disposed ahead of the support part 1512 in the direction in which the friction part 1514 is rotated toward one side of the inside of the body part. Accordingly, the support part 1512 can stably support the friction part 1514 that is subjected to friction and interference with the clothing behind the friction part 1514.

According to embodiments of the present disclosure, the outside of the friction part 1514 that is subjected to friction and interference with one side of the inside of the body part of clothing the outside may be formed to protrude. Accordingly, as a friction area between the friction part 1514 and the clothing is increased, the body part of the clothing can be effectively subjected to friction and interference with the friction part 1514 and can be stably spread in the diagonal or left and right direction.

According to embodiments of the present disclosure, the friction material may be provided in the outside of the friction part 1514 that is subjected to friction and interference with one side of the inside of the body part. Accordingly, as a friction force between the friction part 1514 and the clothing is increased, the body part of the clothing can be effectively subjected to friction and interference with the friction part 1514 and can be stably spread in the diagonal or left and right direction.

According to embodiments of the present disclosure, one end of the friction part 1514 may be formed to protrude in the direction in which the friction part 1514 is rotated toward one side of the inside of the body part. Accordingly, the protruded one end of the friction part 1514 can rotate while applying pressure to one side of the body part and temporarily spread the clothing, so that the clothing can be subjected to friction and interference with the outside of the friction part 1514 in the state in which the clothing has been spread. Accordingly, the body part of the clothing can be rapidly and stably spread because the body part is effectively subjected to friction and interference with the friction part 1514. Furthermore, the protruded one end of the friction part 1514 can rotate while forming bending on one side of the body part. Accordingly, one side of the inside of the body part can easily come into contact with the outside of the friction part 1514 by the bending, and can be subjected to friction and interference therewith. Accordingly, the body part of the clothing can be rapidly and stably spread because the body part is effectively subjected to friction and interference with the friction part 1514.

According to embodiments of the present disclosure, the friction part 1514 may be coupled with the other end of the support part 1512, and the first through hole 1516 may be formed in the other end of the support part 1512. Accordingly, the other end of the support part 1512 can be easily and elastically deformed by a reaction force of clothing that acts on the friction part 1514, and thus the slope of the friction part 1514 can be easily changed. Accordingly, the body part of the clothing having various sizes or shapes can be easily and stably spread in the diagonal or left and right direction at a low cost through a simple configuration. Furthermore, weight of the support part 1512 can be reduced.

According to embodiments of the present disclosure, the support part 1512 may be formed to be bent in the direction in which the support part 1512 is rotated toward one side of the inside of the body part. Accordingly, as an external force, such as a shearing force applied to the support part 1512 by a reaction force of the clothing, is distributed at the bent location, the body spreading arm 1510 can be firmly and stably supported, the clothing can be effectively and stably spread, and the durability of the clothing treatment apparatus 10 can be improved.

According to embodiments of the present disclosure, with respect to the support part 1512 that has been bent at n locations and formed to be bent in an arch shape, the length of the first section including the rotation axis, among (n+1) sections divided by the n locations may be smaller than a value obtained by dividing a total length of the (n+1) sections by n+1. Accordingly, the first section may not be easily deformed and a maximum shearing force that acts on the first section can be reduced because the length of the first section to which a great shearing force is applied by a reaction force of clothing is small. Accordingly, clothing can be effectively and stably spread and the durability of the clothing treatment apparatus 10 can be improved because the body spreading arm 1510 can be firmly and stably supported.

According to embodiments of the present disclosure, with respect to the support part 1512 that has been bent at n locations and formed to be bent in an arch shape, the length of the section may be gradually increased from the first section including the rotation axis of the support part 1512 toward a section coupled with the friction part 1514. Accordingly, each section may not be easily deformed and a maximum shearing force that acts on each section can maintain a specific value or less because the length of each section is determined in reverse order of the size of a shearing force that is applied to each section by a reaction force of clothing. Accordingly, clothing can be effectively and stably spread and the durability of the clothing treatment apparatus 10 can be improved because the body spreading arm 1510 can be firmly and stably supported.

According to embodiments of the present disclosure, the body spreading part 1500 may be configured to include the left body spreading part disposed on the left of the body part and the right body spreading part disposed on the right of the body part. Accordingly, clothing can be stably spread in the diagonal or left and right direction because the body part of clothing can be simultaneously spread to the left and the right.

According to embodiments of the present disclosure, the body binding clip 1410 may be disposed below the upper support part 1300 and may be installed toward the body part of clothing. Accordingly, the body part of the clothing can be fixed and spread in up and down direction thereof. Furthermore, as the body part of the clothing can be fixed in the up and down direction, the body part of the clothing can be stably spread in the diagonal or left and right direction by the body spreading part 1500.

According to embodiments of the present disclosure, the body binding clip 1410 may be installed in a way to be movable up and down toward the body part of clothing. Accordingly, clothing having various sizes or shapes can be easily and stably fixed at a low cost through a simple configuration.

According to embodiments of the present disclosure, the body binding clip 1410 may be disposed below a central part of the upper support part 1300. Accordingly, as the body binding clip 1410 can fix a central part of the body part of clothing, the clothing can be easily fixed even without fastening a front button on the clothing, and the clothing can be spread in up and down direction thereof.

According to embodiments of the present disclosure, as the body binding clip 1410 may be connected to the elastic body included in the flexible part 1420, a sufficient tensile force may be applied to clothing by the body binding clip 1410 fastened to the bottom of the clothing, and thus the clothing can be easily spread in up and down direction thereof at a low cost through a simple configuration.

According to embodiments of the present disclosure, the measuring part may measure a reaction force of clothing that acts on the body spreading arm 1510 or the sleeve spreading arm 1620, and the controller may control the rotation of the first driving part 1520 or the second driving part 1630 based on a measured value of the measuring part. Accordingly, damage to the clothing can be prevented and the clothing can be effectively and stably spread because a suitable tensile force can be applied to the clothing based on a size, shape, or material of the clothing.

According to embodiments of the present disclosure, the measuring part may measure a reaction force of clothing that acts on the body spreading arm 1510 or the sleeve spreading arm 1620 based on a change in the current applied to the first driving part 1520 or the second driving part 1630. Accordingly, a reaction force of the clothing can be easily measured at a low cost through a simple configuration.

According to embodiments of the present disclosure, the sleeve spreading part 1600 disposed below the upper support part 1300 may be configured to include the fixing part 1610, the sleeve spreading arm 1620, and the second driving part 1630. The fixing part 1610 may have at least a part disposed in up and down direction thereof inside the sleeve part of clothing. The sleeve spreading arm 1620 may have at least a part disposed inside the body part of clothing supported by the upper support part 1300, and may rotate by using one end thereof as a rotation axis. The second driving part 1630 may rotate the sleeve spreading arm 1620. Accordingly, the sleeve part of the clothing can be easily, effectively, and stably spread in a diagonal or left and right direction thereof at a low cost. Furthermore, fixing means for spreading the sleeve part in the up and down direction or the left and right direction can be minimized because the sleeve part of the clothing can be spread in the diagonal direction. Furthermore, the sleeve spreading part 1600 can be installed in a small space because the sleeve spreading arm 1620 can rotate on one plane and spread the clothing.

According to embodiments of the present disclosure, the fixing part 1610 may include the accommodation part 1612 for accommodating the sleeve spreading arm 1620. Accordingly, in the initial state of the sleeve spreading part 1600, the sleeve spreading arm 1620 can be accommodated in the accommodation part 1612, and the sleeve spreading part 1600 can be easily covered with the sleeve part of clothing.

According to embodiments of the present disclosure, the sleeve spreading arm 1620 may rotate toward a central part of the body part of the clothing, and may be subjected to friction and interference with one side of the inside of the sleeve part. Accordingly, the sleeve spreading part 1600 can be installed in a small space.

According to embodiments of the present disclosure, one end of the link part 1640 may be coupled with the second driving part 1630, and the other end thereof may be coupled with the sleeve spreading arm 1620. The sleeve spreading arm 1620 may rotate in response to the rotation of the link part 1640. Accordingly, as the second driving part 1630 can drive the sleeve spreading arm 1620 through the link part 1640, the second driving part 1630 does not need to be disposed inside the sleeve part of clothing in order to drive the sleeve spreading arm 1620, and may be disposed away from the sleeve part. Accordingly, a cost can be reduced because the size of the second driving part 1630 does not need to be small, and the second driving part 1630 can be prevented from being damaged by steam sprayed onto the sleeve part of clothing, etc.

According to embodiments of the present disclosure, the sliding hole 1622 may be formed on one side of the sleeve spreading arm 1620. The protruded part 1642 that penetrates the sliding hole 1622 and that slides and moves along the sliding hole 1622 may be provided at the other end of the link part 1640. Accordingly, the second driving part 1630 can easily and stably drive the sleeve spreading arm 1620 through the link part 1640 at a low cost through a simple configuration.

According to embodiments of the present disclosure, an outside of the sleeve spreading arm 1620, which is subjected to friction and interference with one side of the inside of the sleeve part, may be formed to protrude. Accordingly, the sleeve part of the clothing can be effectively subjected to friction and interference with the sleeve spreading arm 1620 and can be stably spread in the diagonal or left and right direction because a friction area between the sleeve spreading arm 1620 and the clothing is increased.

According to embodiments of the present disclosure, the second through hole 1624 may be formed in the sleeve spreading arm 1620. Accordingly, as the sleeve spreading arm 1620 may be easily elastically deformed in response to a reaction force of clothing that acts on the sleeve spreading arm 1620, the sleeve part of clothing having various sizes or shapes can be easily and stably spread in the diagonal or left and right direction at a low cost through a simple configuration. Furthermore, weight of the sleeve spreading arm 1620 can be reduced.

According to embodiments of the present disclosure, the sleeve binding clip 1650 that comes into contact with one surface of the fixing part 1610 may be provided at the lower part of the fixing part 1610. Accordingly, the sleeve part can be easily and rapidly fixed at a low cost through a simple configuration and can be spread in up and down direction thereof because the sleeve part can be fixed by pushing the end of the sleeve part between the fixing part 1610 and the sleeve binding clip 1650 when the fixing part 1610 is covered with the sleeve part of clothing.

According to embodiments of the present disclosure, the driving step S1710 of the body spreading arm 1510 or the sleeve spreading arm 1620 being rotated by the first driving part 1520 or the second driving part 1630 and spreading clothing, the measuring step S1720 of measuring a reaction force of clothing that acts on the body spreading arm 1510 or the sleeve spreading arm 1620, and the control step S1730 of controlling the rotation of the first driving part 1520 or the second driving part 1630 based on a measured value measured in the measuring step S1720 may be included. Accordingly, damage to the clothing can be prevented and the clothing can be effectively and stably spread because a suitable tensile force can be applied to the clothing based on a size, shape, or material of clothing.

Detailed effects of the present disclosure, together with the aforementioned effects, are also described hereinafter while detailed contents for implementing the disclosure are described.

DESCRIPTION OF DRAWINGS

FIG. 1 is a perspective view illustrating a clothing treatment apparatus according to an embodiment of the present disclosure.

FIGS. 2 to 4 are perspective views and a front view illustrating some elements of the clothing treatment apparatus in FIG. 1.

FIG. 5 is a front view illustrating a movable spray part according to an embodiment of the present disclosure.

FIG. 6 is a perspective view illustrating some elements of the clothing treatment apparatus in FIGS. 2 to 4, and FIGS. 7, 8, and 9 are respective perspective views illustrating some elements in FIG. 6.

FIG. 10 is a partially enlarged perspective view of a part of the clothing treatment apparatus in FIGS. 2 to 4, and FIG. 11 is a partial perspective view illustrating some elements of the clothing treatment apparatus in FIG. 10.

FIG. 12 is a perspective view illustrating a part of a unit chain according to an embodiment of the present disclosure, and FIGS. 13 and 14 are state diagrams illustrating an embodiment relating to a method of controlling bending/rotation.

FIG. 15 is a front view illustrating a support part according to an embodiment of the present disclosure.

FIGS. 16 to 21 are perspective views and front views illustrating some elements of the clothing treatment apparatus in FIG. 1, and are diagrams illustrating various states according to the rotation of a body spreading part and a sleeve spreading part.

FIG. 22 is a perspective view illustrating a body fixing part 1400 according to an embodiment of the present disclosure.

FIGS. 23 to 26 are state diagrams illustrating an initial state (FIG. 23) of a body spreading arm 1510 and states (FIGS. 24 to 26) in which the body spreading arm 1510 rotates in the body spreading part 1500 according to an embodiment of the present disclosure.

FIGS. 27 and 28 are a perspective view and a front view illustrating an initial state in which a sleeve spreading arm has not been spread in the sleeve spreading part according to an embodiment of the present disclosure.

FIGS. 29 and 30 are a perspective view and a front view illustrating the state in which the sleeve spreading arm has been spread in the sleeve spreading part according to an embodiment of the present disclosure.

FIG. 31 is a front view illustrating a sleeve spreading part according to another embodiment of the present disclosure.

FIG. 32 is a flowchart illustrating a method of controlling the clothing treatment apparatus according to an embodiment of the present disclosure.

MODE FOR INVENTION

The aforementioned objects, characteristics, and merits are described below in detail with reference to the accompanying drawings, and thus a person having ordinary knowledge in the art to which the present disclosure pertains may readily practice the technical spirit of the present disclosure. Furthermore, in describing the present disclosure, a detailed description of a known art related to the present disclosure will be omitted if it is deemed to make the subject matter of the present disclosure unnecessarily vague. Hereinafter, embodiments according to the present disclosure are described in detail with reference to the accompanying drawings. In the drawings, the same reference numerals are used to denote the same or similar elements.

The present disclosure is not limited to the embodiments disclosed hereinafter, and may be variously changed and may be implemented in various different forms. The embodiments are merely provided to complete the present disclosure and to fully notify a person having ordinary knowledge in the art to which the present disclosure pertains of the category of the present disclosure. Accordingly, it is to be understood that the present disclosure is limited to embodiments disclosed hereinafter and that the present disclosure includes all changes, equivalents, and substitutions which fall within the technical spirit and scope of the present disclosure in addition to the substitution or addition of an element in any one embodiment with or to an element in another embodiment.

It is to be understood that the accompanying drawings are merely intended to help easily understood the embodiments disclosed in this specification, and the technical spirit disclosed in this specification is not restricted by the accompanying drawings and includes all changes, equivalents, and substitutions which fall within the spirit and technical scope of the present disclosure. In the drawings, the size or thickness of each of elements may be exaggerated and expressed largely or small by considering convenience of understanding, etc., but the right of scope of the present disclosure should not be construed as being limited accordingly.

The terms used in this specification are merely used to describe a specific implementation example or embodiment, and are not intended to limit the present disclosure. Furthermore, an expression of the singular number includes an expression of the plural number unless clearly defined otherwise in the context. In the specification, a term, such as "include" or "consist of", is intended to designate that a characteristic, a number, a step, an operation, an element, a part or a combination of them described in the specification is present. That is, it is to be understood that the term, such as "include" or "consist of", in the specification does not exclude the presence or addition possibility of one or more other characteristics, numbers, steps, operations, elements, parts, or combinations of them in advance. Furthermore, it should not be construed that the term, such as "include" or "consist of", in the specification must include all of a characteristic, a number, a step, an operation, an element, a part or a combination of them described in the specification.

Terms, such as a "first" and a "second", may be used to describe various elements, but the elements are not limited by the terms. The terms are used to only distinguish one element from the other element. A first element may be a second element unless specially described to the contrary.

When it is said that one component is "connected" or "coupled" to another component, it should be understood that one component may be directly connected or coupled to another component, but a third component may exist between the two components. In contrast, when it is described that one component is "directly connected" or "brought into direct contact with" the other component, it should be understood that a third component does not exist between the two components.

It should be understood that when it is described that one element is disposed "over"/"above" or "under"/"below" the other element, the one element may be disposed right over or under the other element or another element may be disposed between the two elements.

All terms used herein, including technical or scientific terms, have the same meanings as those commonly understood by a person having ordinary knowledge in the art to which an embodiment pertains, unless defined otherwise in the specification. Terms, such as those defined in commonly used dictionaries, should be construed as having the same meanings as those in the context of a related technology, and are not construed as being ideal or excessively formal meanings unless explicitly defined otherwise in the specification.

Hereinafter, a clothing treatment apparatus and a method of controlling the same according to some embodiments of the present disclosure are described.

FIG. 1 is a perspective view illustrating a clothing treatment apparatus according to an embodiment of the present disclosure.

Referring to FIG. 1, a clothing treatment apparatus 10 according to an embodiment may be configured to include a heating part 100, a movable spray part 200, a flow path member 300, a driving part 400, first/second/third guide parts 500, 600, and 700, a controller 800, an upper support part 1300, a body fixing part 1400, a body spreading part 1500, and a sleeve spreading part 1600.

FIGS. 2 to 4 are perspective views and a front view illustrating some elements of the clothing treatment apparatus in FIG. 1.

Referring to FIGS. 2 to 4, the clothing treatment apparatus 10 according to an embodiment may be configured to include the heating part 100, the movable spray part 200, the flow path member 300, the driving part 400, the second guide part 600, and the third guide part 700. Furthermore, the heating part 100 and the movable spray part 200 may be connected to the flow path member 300, a second flow path pipe 900, and a third flow path pipe 1000.

[Heating Part]

The heating part 100 may be connected to the flow path member 300, and may be connected to the movable spray part 200 through the flow path member 300.

Furthermore, the heating part 100 may be connected to the third flow path pipe 1000 and/or the second flow path pipe 900, and may be connected to the flow path member 300 through the third flow path pipe 1000 and/or the second flow path pipe 900.

The heating part 100 may be configured to heat a fluid, and may supply the heated fluid to the movable spray part 200. In this case, the fluid may correspond to water or air, for example.

[Movable Spray Part]

The movable spray part 200 may be connected to the flow path member 300 and may be connected to the heating part 200 through the flow path member 300. Furthermore, the movable spray part 200 may be installed movably in a constant direction (e.g., a left and right direction thereof), and may be coupled with the driving part 400.

In the drawings, the movable spray part 200 has been installed movably in the left and right direction, but the present disclosure is not limited thereto. For example, unlike the drawings, the movable spray part 200 may be installed movably in up and down direction thereof.

The movable spray part 200 may spray a heated fluid supplied by the heating part 200 while moving in a constant direction (e.g., the left and right direction).

When the movable spray part 200 moves in the left and right direction, the heated fluid may be individually sprayed onto a sleeve part and body part of clothing that has been spread in the form of a sleeve-body-sleeve in the left and right direction within the clothing treatment apparatus 10. In particular, the heated fluid may be intensively sprayed onto the sleeve part of the clothing which requires a treatment time, such as wrinkle removal, longer than that for the body part.

As described above, the movable spray part 200 is coupled with the driving part 400 and sprays the heated fluid while moving in the left and right direction. Accordingly, clothing treatment performance, such as wrinkle removal, can be improved and a clothing treatment time can be reduced because the heated fluid can be individually sprayed onto the sleeve part and body part of the clothing.

Furthermore, the movable spray part 200 may be disposed above the heating part 100.

As the movable spray part 200 is disposed above the heating part 100 as described above, condensed water can be prevented from being discharged because the condensed water can easily flow down to the heating part 100 although the condensed water is generated within the movable spray part 200.

Furthermore, the outside of the movable spray part 200 may be coated with an insulator, such as fabric or silicon.

Condensed water can be prevented from being generated within the movable spray part 200 because the outside of the movable spray part 200 is coated with the insulator as described above.

Furthermore, the movable spray part 200 may be in plural (two in the drawings) in a way to be spaced apart from each other in forward and backward direction thereof. Clothing may be disposed between the plurality of movable spray parts 200 that are spaced apart from each other in the forward and backward direction.

As described above, the movable spray part 200 is installed in plural in a way to be spaced apart from each other in the forward and backward direction within the clothing treatment apparatus 10. Accordingly, clothing can be rapidly and easily treated because the movable spray part 200 can simultaneously spray a heated fluid onto the front and back of the clothing.

The movable spray part 200 is further described with reference to FIG. 5.

FIG. 5 is a front view illustrating the movable spray part according to an embodiment of the present disclosure.

Referring to FIG. 5, the movable spray part 200 according to an embodiment may be configured to include an inlet 210, a spray pipe 230, a support member 240, a first coupling part 250, a second coupling part 260, and a third coupling part 270.

[Inlet]

The inlet 210 may be formed in the lower part of the movable spray part 200, and may be connected to the flow path member 300.

As the inlet 210 is formed in the lower part of the movable spray part 200 as described above, condensed water can be prevented from being discharged because the condensed water can easily flow into the inlet 210 connected to the heating part 100 although the condensed water is generated within the movable spray part 200.

The inlet 210 may introduce a heated fluid into the movable spray part 200.

[Spray Port]

A spray port 220 may be formed in plural in the spray pipe 230 along longitudinal direction of the spray pipe 230.

In this case, the plurality of spray ports 220 formed in any one spray pipe 230 may have different heights from the plurality of spray ports 220 formed in another spray pipe 230. This is described later.

The spray port 220 may spray, to the outside, a heated fluid supplied through the flow path member 300.

[Spray Pipe]

The spray pipe 230 may communicate with the inlet 210, and may be disposed in up and down direction thereof. Furthermore, the plurality of spray ports 220 may be formed in the spray pipe 230 along longitudinal direction of the spray pipe 230. The spray pipe 230 may be a pole form.

As the spray pipe 230 in which the plurality of spray ports 220 is formed along longitudinal direction thereof is disposed in the up and down direction thereof as described above, performance, such as wrinkle removal, can be improved and a clothing treatment time can be reduced because a heated fluid can be individually sprayed onto a sleeve part and body part of clothing.

Furthermore, one movable spray part 200 may be configured to include the plurality of spray pipes 230. Accordingly, as the movable spray part 200 consists of the plurality of spray pipes 230 disposed in up and down direction thereof, the movable spray part 200 can stably move without being inclined or bent.

The durability and stability of the movable spray part 200 can be improved because the movable spray part 200 is configured to include the plurality of spray pipes 230 as described above.

In this case, in order to maintain spray pressure and a flow rate, a cross section of each spray pipe 230 may be formed to be smaller than a cross section of the inlet 210.

Furthermore, the plurality of spray ports 220 formed in at least two spray pipes 230 have different heights from each other. Specifically, for example, as in FIG. 5, the heights of seven spray ports 220 formed in a left spray pipe **230*a* and the heights of seven spray ports 220 formed in a right spray pipe 230*b*** may be different from each other.

As described above, the heights of the plurality of spray ports 220 formed in any one spray pipe 230 and the heights of the plurality of spray ports 220 formed in another spray pipe 230 may be different from each other. Accordingly, a heated fluid can be uniformly sprayed at high pressure although the movable spray part 200 consists of the plurality of spray pipes 230 because a total of the spray ports 220 necessary for clothing treatment can be uniformly distributed and formed in the plurality of spray pipes 230.

Meanwhile, the spray ports 220 can consecutively spray heated fluids in a left and right direction thereof in response to a movement of the movable spray part 200 in the left and right direction. Accordingly, although a total of the spray ports 220 are distributed and formed in the plurality of spray pipes 230 in a way that the heights of the spray ports 220 are different from each other, the heated fluids can be sprayed onto the same region or area compared to a case where a total of the spray ports 220 are formed in one spray pipe 230.

Furthermore, the movable spray part 200 may be configured to include the plurality of spray pipes 230 disposed to be spaced apart from each other. The support member 240 that supports the spray pipes 230 may be provided between at least two spray pipes 230. The support member 240 is described later.

Furthermore, the lower part of the spray pipe 230 that communicates with the inlet 210 may be formed to be downward inclined. Specifically, for example, as in FIG. 5, the lower parts of the two spray pipes 230*a* and 230*b* may be formed to be downward inclined while forming an "arc" toward the inlet 210.

As described above, the lower part of the spray pipe 230 that communicates with the inlet 210 may be formed to be downward inclined. Accordingly, although condensed water is generated within the spray pipe 230, the condensed water can be prevented from being discharged through the spray port 220 because the condensed water can easily flow into the inlet 210 connected to the heating part 100.

[Support Member]

The support member 240 may be provided between at least two spray pipes 230, which are disposed to be spaced apart from each other, and may be coupled with the two spray pipes 230. For example, as in FIG. 5, the support member 240 may be provided between the two spray pipes 230*a* and 230*b* disposed to be spaced apart from each other, and may be coupled with the two spray pipes 230*a* and 230*b*.

As described above, the movable spray part 200 may be configured to include the plurality of spray pipes 230 disposed to be spaced apart from each other. The support member 240 that supports the spray pipe 230 may be provided between at least two spray pipes 230. Accordingly, the durability and stability of the movable spray part 200 can be improved, and vibration or noise can be reduced when the movable spray part 200 is moved.

Furthermore, the support member 240 may be provided in plural between the two spray pipes 230 disposed to be spaced apart from each other in a way to be spaced apart from each other up and down.

The durability and stability of the movable spray part 200 can be further improved and vibration or noise can be further reduced when the movable spray part 200 is moved because the support member 240 is provided in plural between at least two spray pipes 230 disposed to be spaced apart from each other in a way to be spaced apart from each other up and down as described above.

The support member 240 may support the plurality of spray pipes 230.

[Coupling Part]

The first coupling part 250 may be coupled with the driving part 400 and/or the first guide part 500 to be described later.

The second coupling part 260 may be coupled with the second guide part 600 to be described later.

The third coupling part 270 may be coupled with the third guide part 700 to be described later.

[Flow Path Member, Flow Path Pipe]

The flow path member 300, the second flow path pipe 900, and the third flow path pipe 1000 may be disposed between the heating part 100 and the movable spray part 200, and may connect the heating part 100 and the movable spray part 200.

The flow path member 300, the second flow path pipe 900, and the third flow path pipe 1000 may supply the movable spray part 200 with a heated fluid supplied by the heating part 100. The flow path member 300, the second flow path pipe 900, and the third flow path pipe 1000 are described later.

Hereinafter, the driving part 400 and the guide parts 500, 600, and 700 are described with reference to FIGS. 6 to 9.

FIG. 6 is a perspective view illustrating some elements of the clothing treatment apparatus in FIGS. 2 to 4, and FIGS. 7, 8, and 9 are respective perspective views illustrating some elements in FIG. 6.

[Driving Part]

Referring to FIGS. 6 and 7, the driving part 400 according to an embodiment may be configured to include a driving motor 410, a ball screw bolt 420, and a ball screw nut 430, for example.

The driving motor 410 may be coupled with one end of the ball screw bolt 420, and may rotate the ball screw bolt 420 at its proper place forward or backward.

A screw thread may be formed in an outer circumference surface of the ball screw bolt 420. One end of the ball screw bolt 420 may be coupled with the driving motor 410, and a part of the outer circumference surface thereof may be coupled with the ball screw nut 430.

The ball screw nut 430 may be coupled with the outer circumference surface of the ball screw bolt 420, and may move in a left and right direction thereof in response to the forward or backward rotation of the ball screw bolt 420.

However, the driving part 400 is not limited to such a configuration.

The driving part 400 may be coupled with the movable spray part 200. Specifically, for example, the ball screw nut 430 of the driving part 400 may be coupled with the first coupling part 250 provided at a central part of the movable spray part 200.

The number of driving motors 410 can be minimized and vibration or noise can be minimized when the movable spray part 200 moves because the driving part 400 is coupled with the central part of the movable spray part 200 as described above.

Furthermore, the driving part 400 may be coupled with the first guide part 500 that is described later. This is described later.

The driving part 400 may move the movable spray part 200 in the left and right direction.

[First Guide Part]

The first guide part 500 may be disposed around the central part of the movable spray part 200. Furthermore, the first guide part 500 may be configured to include a first guide rail 510 and a first guide coupling part 520 (FIG. 7).

The first guide rail 510 may be formed in a left and right direction thereof, and may be coupled with the first guide coupling part 520.

The first guide coupling part 520 may be coupled with the first guide rail 510 in a way to be slidable along the first guide rail 510.

Furthermore, the first guide coupling part 520 may be coupled with the driving part 400 and the movable spray part 200. Specifically, for example, the first guide coupling part 520 may be coupled with the ball screw nut 430 of the driving part 400 and the first coupling part 250 of the movable spray part 200.

As described above, the driving part 400 may be coupled with the central part of the movable spray part 200 and the first guide coupling part 520, and may move the movable spray part 200 in the left and right direction. Accordingly, a movement of the movable spray part 200 can be facilitated and vibration or noise can be reduced when the movable spray part 200 moves because the movable spray part 200 can be supported and guided by the first guide part 500 as well as the driving part 400.

[Second Guide Part and Third Guide Part]

Referring to FIG. 8, the second guide part 600 according to an embodiment may be configured to include a second guide rail 610 and a second guide coupling part 620. Furthermore, the second guide part 600 may be disposed around the upper part of the movable spray part 200.

The second guide rail 610 may be formed in a left and right direction thereof, and may be coupled the second guide coupling part 620.

The second guide coupling part 620 may be coupled with the second guide rail 610 in a way to be slidable along the second guide rail 610.

Furthermore, the second guide coupling part 620 may be coupled with the movable spray part 200. Specifically, for example, the second guide coupling part 620 may be coupled with the second coupling part 260 of the movable spray part 200.

Referring to FIG. 9, the third guide part 700 according to an embodiment may be configured to include a third guide rail 710, and a third guide coupling part 720. Furthermore, the third guide part 700 may be disposed around the lower part of the movable spray part 200.

The third guide rail 710 may be formed in a left and right direction thereof, and may be coupled with the third guide coupling part 720.

The third guide coupling part 720 may be coupled with the third guide rail 710 in a way to be slidable along the third guide rail 710.

Furthermore, the third guide coupling part 720 may be coupled with the movable spray part 200. Specifically, for example, the third guide coupling part 720 may be coupled with the third coupling part 270 of the movable spray part 200.

As described above, one or more guide rails 610 or/and 710 may be disposed around at least any one of the upper and lower parts of the movable spray part 200. The movable spray part 200 may be coupled with the one or more guide rails 610 or/and 710 and slide and move along the one or more guide rails 610 or/and 710. Accordingly, a movement of the movable spray part 200 can be facilitated and vibration or noise can be reduced when the movable spray part 200 moves because the movable spray part 200 can be supported and guided by the second guide part 600 or the third guide part 700.

A protruded part 730 that protrudes at a specific slope may be formed on the third guide coupling part 720. As the third guide coupling part 720 is coupled with the movable spray part 200, the protruded part 730 formed on the third guide coupling part 720 can move along with the movable spray part 200. The protruded part 730 is described later.

[Controller]

The controller 800 may be connected to the driving part 400, and may control a movement of the movable spray part 200. If the movable spray part 200 has been provided in plural and the plurality of movable spray parts 200 has been installed to be spaced apart from each other in forward and backward direction thereof, the controller 800 may individually control movements of the plurality of movable spray parts 200. In this case, the movement may mean a moving speed, a moving location, the number of round trips in a specific section, etc.

As the controller 800 individually controls movements of the plurality of movable spray parts 200 that are installed in a way to be spaced apart from each other in the forward and backward direction thereof as described above, a heated fluid can be sprayed onto an optimal location before and after clothing based on a shape, size, or material of clothing or characteristics for each portion of clothing. Accordingly, clothing treatment performance, such as wrinkle removal, and efficiency can be improved, and a clothing treatment time can be reduced.

In particular, the controller 800 enables the movable spray part 200 to make a round trip several times in a section to which a portion for which wrinkle removal, such as a front button part of clothing, is difficult belongs so that a heated fluid is intensively sprayed onto the portion. Accordingly, clothing treatment performance, such as wrinkle removal, can be improved, and a clothing treatment time can be reduced.

[Detailed Description of Flow Path Member]

FIG. 10 is a partially enlarged perspective view of a part of the clothing treatment apparatus in FIGS. 2 to 4, and FIG. 11 is a partial perspective view illustrating some elements of the clothing treatment apparatus in FIG. 10.

Referring to FIGS. 4, 10, and 11, the heating part 100 and the movable spray part 200 may be connected through the flow path member 300, the second flow path pipe 900, and the third flow path pipe 1000. Furthermore, the protruded part 730 may be formed to protrude at a specific slope, and may be coupled with the flow path member 300.

The flow path member 300 may be bent or spread at an angle having a specific range for each unit member 310 in response to a movement of the movable spray part 200. In this case, bending may mean that the unit member 310 rotates.

Specifically, for example, the flow path member 300 may be configured to include a chain consisting of a unit chain 310*a* (FIG. 11) as in the drawing and a first flow path pipe 350 that is disposed in parallel with the chain in the longitudinal direction of the chain to follow the bending of the chain and that is flexible.

Furthermore, the bending angle (rotation angle) of the unit chain 310*a* may be controlled for each unit chain 310*a*. The first flow path pipe 350 may be disposed inside the chain, for example, as in the drawing, but the present disclosure is not limited thereto.

That is, the unit member 310 may consist of, for example, the unit chain 310*a* having the bending angle (rotation angle) controlled and a part of the first flow path pipe 350 that is made of a flexible material and that is disposed in parallel with the unit chain 310*a*.

If the unit member 310 is configured as described above, the bending angle (rotation angle) of the unit member 310 may be controlled by the unit chain 310*a*. Accordingly, a method of controlling the bending/rotation of the unit chain 310*a* may correspond to a method of controlling the bending/rotation of the unit member 310.

The method of controlling the bending/rotation of the unit member 310 or the unit chain 310*a* is described with reference to FIGS. 12 to 14.

FIG. 12 is a perspective view illustrating a part of the unit chain according to an embodiment of the present disclosure, and FIGS. 13 and 14 are state diagrams illustrating an embodiment relating to a method of controlling bending/rotation.

Referring to FIG. 12, the unit chain 310*a* according to an embodiment may be configured to include a pair of side plates 311*a* and 311*b* that face each other, and a lower plate 312 and an upper plate 314 that are installed at a lower edge and upper edge of the side plates 311*a* and 311*b* so that the side plates 311*a* and 311*b* maintain a constant interval. Coupling parts 313 and 315 may be formed on both sides of the side plates 311*a* and 311*b*, and may be rotatably coupled with the coupling parts 313 and 315 of another unit chain 310*a*. A lower step 316 and an upper step 318 may be formed at edges of the side plates 311*a* and 311*b* on one side thereof.

Referring to FIG. 13, the two unit chains 310*a* may be rotatably coupled. In this case, in the state in which the two unit chains 310*a* have been spread, the bending/rotation of the unit chain 310*a* may be controlled because a right unit chain 310*a* cannot rotate in a clockwise direction (in an arrow direction in FIG. 13) on the basis of a left unit chain 310*a*.

Specifically, in the state in which the two unit chains 310*a* have been spread, the right unit chain 310*a* cannot rotate in the clockwise direction because the lower plate 312 of the right unit chain 310*a* is interfered with the lower step 316 of the left unit chain 310*a*.

Referring to FIG. 14, in the state in which the two unit chains 310*a* have been spread, the bending/rotation of the unit chain 310*a* may be controlled because the right unit chain 310*a* can rotate only at an angle having a specific range in a counterclockwise direction (an arrow direction in FIG. 14) on the basis of the left unit chain 310*a*.

Specifically, in the state in which the two unit chains 310*a* have been spread, the right unit chain 310*a* may rotate at up to a specific angle (a maximum angle) in the counterclockwise direction until the upper plate 314 of the right unit chain 310*a* is interfered with the upper step 318 of the left unit chain 310*a*. That is, the right unit chain 310*a* may rotate only at an angle (an angle equal to or smaller than a maximum angle) having a specific range.

In this case, the maximum angle may correspond to 10 degrees to 40 degrees. As a maximum rotation (bending) angle for each unit chain 310*a* or each unit member 310 is set to 10 degrees to 40 degrees as described above, a heated fluid having a high temperature/high pressure can easily flow because curvature of the flow path member 300 consisting of the unit member 310 becomes sufficiently small. Accordingly, the durability and coupling force of the flow path member 300 can be improved because damage to the flow path member or decoupling from the movable spray part 200, etc. attributable to an increase in pressure of the flow path member 300 is suppressed.

Meanwhile, if locations or forms of the lower/upper plates 312 and 314 or the lower/upper steps 316 and 318 are changed, a maximum angle at which the unit chain 310*a* may rotate can be changed. For example, if the location where the lower step 316 is formed and the location where the lower plate 312 is installed are changed into locations corresponding to locations of the upper step 318 and the upper plate 314, in the state in which the two unit chains 310*a* have been spread, the right unit chain 310*a* can rotate at an angle having a specific range even in the clockwise direction unlike FIG. 13.

However, a method of controlling the bending/rotation of the unit chain 310*a* is not limited to the methods described with reference to FIGS. 12 to 14. For example, the step may be formed at another location (e.g., the coupling part) other than the edges of the side plates 311*a* and 311*b* on one side thereof, and the bending/rotation may be controlled by using another element or method other than the step.

The flow path member 300 configured by coupling the unit member 310, including the unit chains 310*a*, in plural is described.

The flow path member 300 configured by coupling the unit member 310, including the unit chains 310*a*, in plural in FIGS. 12 to 14 may be bent only in one direction (the counterclockwise direction) on the basis of the state in which the flow path member 300 has been spread. Furthermore, when the flow path member 300 is bent in one direction (the clockwise direction), the flow path member 300 may be bent at an angle within a specific range for each unit member 310.

Furthermore, as described above, for example, when locations or forms of the lower/upper plates 312 and 314 or the lower/upper steps 316 and 318 are changed, the flow path member 300 configured by coupling the unit members 310 may be bent in both directions (the clockwise direction and the counterclockwise direction) on the basis of the state in which the flow path member 300 has been spread, unlike FIGS. 12 to 14. Furthermore, when the flow path member 300 is bent in both the directions, the flow path member 300 may be bent in both the directions at an angle within a specific range for each unit member 310.

Furthermore, a maximum angle at which unit member 310 is bent in one direction may be greater than a maximum angle at which the unit member 310 is bent in the other direction on the basis of the state in which the flow path member 300 has been spread.

As described above, as the flow path member 300 connected to the heating part 100 and the movable spray part 200 is bent or spread at an angle having a specific range for each unit member 310 in response to a movement of the movable spray part 200, spray pressure of the movable spray part 200 can be constantly maintained because the flow path member 300 is bent in a constant form, not an arbitrary form, and an installation space of the flow path member 300 can be minimized because a movement/deformation space of the flow path member 300 is constant. Furthermore, as the flow path member 300 is bent in a simple form, a flow path can be prevented from being clogged by condensed water or condensed water can be prevented from being sprayed because the condensed water is prevented from being generated within the flow path member 300. Furthermore, as the flow path member 300 is gently bent in a simple form, damage to the flow path member 300 or decoupling from the movable spray part 200, etc. attributable to an increase in pressure can be suppressed although a fluid having a high temperature/high pressure flows. Accordingly, the durability and coupling force of the flow path member 300 can be easily improved at a low cost.

Furthermore, as a maximum angle at which the flow path member 300 is bent in one direction for each unit member 310 is greater than a maximum angle at which the flow path member 300 is bent in the other direction for each unit member 310 on the basis of the state in which the flow path member 300 has been spread, the flow path member 300 can be stably deformed in a simple and constant form because the flow path member 300 is biased and bent in one direction.

Accordingly, as described above, spray pressure of the movable spray part 200 can be constantly maintained, and an installation space of the flow path member 300 can be minimized because a movement/deformation space of the flow path member 300 is constant. Furthermore, a flow path can be prevented from being clogged by condensed water or condensed water can be prevented from being sprayed because the condensed water is prevented from being generated within the flow path member 300. Furthermore, the durability and coupling force of the flow path member 300 can be easily improved at a low cost because damage to the flow path member 300 or decoupling from the movable spray part 200, etc. attributable to an increase in pressure is suppressed although a fluid having a high temperature/high pressure flows.

Furthermore, as the flow path member 300 is bent only in one direction on the basis of the state in which the flow path member 300 has been spread, the flow path member 300 can be stably deformed in a simpler and constant form, and a straight-line section in the flow path member 300 can be maximized. Accordingly, the durability of the flow path member 300 can be easily improved at a low cost because a fluid having a high temperature/high pressure can further easily flow, and a coupling force with the movable spray part 200, etc. can be improved.

Furthermore, the flow path member 300 may be configured to include the chain bent at an angle having a specific range for each unit chain 310*a* and the first flow path pipe 350 that is disposed in parallel with the chain in the longitudinal direction of the chain to follow the bending of the chain and that is flexible. Accordingly, the bending angle of the flow path member can be easily controlled at a low cost through a simple configuration.

Meanwhile, the first flow path pipe 350 may be disposed inside the chain, and the outside of the chain may be coated with an insulator, such as fabric.

Accordingly, heat insulation performance can be improved because an air layer is formed between the chain and the first flow path pipe 350, and thus condensed water can be prevented from being generated.

Furthermore, the chain may be made of a plastic material, and thus can reduce its own weight.

Meanwhile, the flow path member 300 is not limited to the configuration including the chain and the first flow path pipe 350. For example, the flow path member 300 may have a unit structure having through holes formed therein along longitudinal direction thereof. Specifically, the unit structure may be rotatably coupled with another unit structure, and rotation thereof may be limited because a step is formed at a part rotatably coupled therewith. Furthermore, when the unit structure is coupled with another unit structure, the through holes formed in the unit structure may communicate with each other. A heated fluid may flow through the through holes.

The flow path member 300 may be bent on one side S thereof, and thus one part P thereof may be overturned. An end E1 of the overturned one part P may be coupled with the movable spray part 200.

Accordingly, as the flow path member 300 is constantly deformed in a simple form in which the bending of the flow path member 300 is minimized, the flow path member 300 can be connected to the movable spray part 200, and an installation space of the flow path member 300 can be minimized. Furthermore, as a bent part of the flow path member 300 is different in response to a movement of the movable spray part 200, a specific part of the flow path member 300 can be prevented from being intensively bent and damaged.

Specifically, for example, as in FIGS. 1 to 11, the flow path member 300 may be disposed in a left and right direction thereof along the movable spray part 200 that moves in the left and right direction. The flow path member 300 may be bent on the one side S, and thus the one part P thereof may be turned upside down. The one part P that has been turned upside down may be disposed above the other part of the flow path member 300. The end E1 of the one part P that has been turned upside down may be coupled with the movable spray part 200.

Accordingly, a flow path can be prevented from being clogged by condensed water or condensed water can be prevented from being sprayed because the condensed water does not move to the movable spray part 200 disposed above the flow path member 300 and downward flows by gravity although the condensed water is generated within the flow path member 300. Furthermore, as described above, the flow path member 300 may be connected to the movable spray part 200 while being deformed in a simple form in which the bending of the flow path member 300 is minimized, an installation space of the flow path member 300 can be minimized, and a specific part of the flow path member 300 can be prevented from being intensively bent and damaged.

Furthermore, when the one part P that has been turned upside down is spread on the basis of the end E1 (an end coupled with the movable spray part) of the one part that has been bent on the one side S of the flow path member 300 and that has been turned upside down, the end E1 may be coupled with the movable spray part 200 so that the one part P that has been turned upside down is downward inclined toward the one side S or forms horizontality.

Accordingly, a flow path can be more certainly prevented from being clogged by condensed water or condensed water can be more certainly prevented from being sprayed because the condensed water does not move to the movable spray part 200 disposed above the flow path member 300 and easily flows downward by gravity although the condensed water is generated within the flow path member 300.

The movable spray part 200 may be coupled with the protruded part 730 that protrudes at a slope at which the protruded part 730 is downward inclined toward the bent one side S of the flow path member 300 or forms horizontality, and may move therewith. The end E1 of the flow path member 300 may be coupled with the protruded part 730.

Accordingly, the one part P that has been turned upside down may be can be stably easily installed at a slope at which the one part P is downward inclined or forms horizontality. Accordingly, a flow path can be more certainly prevented from being clogged by condensed water or condensed water can be more certainly prevented from being sprayed because the condensed water does not move to the movable spray part 200 disposed above the flow path member 300 and easily flows downward by gravity although the condensed water is generated within the flow path member 300.

As described above, the protruded part 730 coupled with the end E1 of the flow path member 300 may be formed on the third guide coupling part 720, but the present disclosure is not limited thereto. For example, the protruded part 730 may be formed on the movable spray part 200.

Meanwhile, the flow path member 300 is not limited to the aforementioned configuration. For example, unlike the drawings, the flow path member 300 may be disposed in up and down direction thereof. Although the flow path member 300 is disposed in the left and right direction, the flow path member 300 may be bent on one side thereof, and a part thereof may be overturned in forward and backward direction thereof. However, in order for the flow path member 300 to be disposed in the up and down direction, the movable spray part 200 may need to be moved up and down.

The other end E2 of the flow path member 300 may be fixed to the clothing treatment apparatus 10 through a bracket 1200 (FIG. 11) coupled with the other end E2. In this case, the other end E2 of the flow path member 300 may mean an end on the opposite side of the end E1 of the flow path member 300 that is coupled with the movable spray part 200.

[Detailed Description of Flow Path Pipe]

The second flow path pipe 900 may have one end that communicates with the other end E2 of the flow path member 300, and the other end that is connected to the heating part 100.

If the flow path member 300 is configured to include the chain and the first flow path pipe 350 as in the drawing, the second flow path pipe 900 may communicate with the first flow path pipe 350 and be coupled therewith.

Furthermore, at least a part of the second flow path pipe 900 may be fixedly installed in the clothing treatment apparatus 10. Specifically, for example, the second flow path pipe 900 may be fixed to the clothing treatment apparatus 10 around a coupling point at which the second flow path pipe 900 communicates with the other end E2 of the flow path member 300 and is coupled therewith.

Accordingly, the second flow path pipe 900 and the flow path member 300 can be stably connected. The flow path member 300 can be easily and stably connected to the second flow path pipe 900 that has a simple structure and that has been fixedly installed without a need to be directly connected to the heating part 100. That is, the flow path member 300 and the second flow path pipe 900 can be easily and stably connected.

In particular, the flow path member 300 may be configured to include the chain and the first flow path pipe 350, and the second flow path pipe 900 connected to the first flow path pipe 350 may be fixedly installed in the clothing treatment apparatus 10 although the first flow path pipe 350 is moved in response to a movement of the movable spray part 200 because the first flow path pipe 350 is not fixed to the chain. Accordingly, the flow path member 300 and the second flow path pipe 900 can be easily and stably connected.

The second flow path pipe 900 may supply the flow path member 300 with a heated fluid supplied by the heating part 100.

The third flow path pipe 1000 may have one end that communicates with the other ends of the plurality of second flow path pipes 900, and the other end that is connected to the heating part 100. In this case, as in the drawing, the second flow path pipes 900 may communicate with different flow path members 300 and movable spray parts 200.

Accordingly, the heating part 100 and the plurality of movable spray parts 200 can be easily and stably connected. Furthermore, although the plurality of movable spray parts 200 is individually moved such that the plurality of first flow path pipes 350 is individually moved, the second flow path pipes 900 connected to the first flow path pipes 350, respectively, may be fixedly installed in the clothing treatment apparatus 10. Accordingly, the third flow path pipe 1000 can be easily and stably connected to the plurality of second flow path pipes 900.

[Support Part]

FIG. 15 is a front view illustrating the support part according to an embodiment of the present disclosure.

Referring to FIG. 15, a support part 1100 according to an embodiment may be disposed under the flow path member 300, and may be configured to include a plurality of supports 1110 disposed to be spaced apart from each other in a left and right direction thereof.

An upper cross section of each of the supports 1110 may be convexly formed in a streamlined shape.

As the supports 1110 each having the upper cross section convexly formed in the streamlined shape as described above are disposed under the flow path member 300 in a way to be spaced apart from each other, the supports 1110 can stably support the flow path member 300 while minimizing the occurrence of noise.

FIGS. 16 to 21 are perspective views and front views illustrating some elements of the clothing treatment apparatus in FIG. 1, and are diagrams illustrating various states according to the rotation of the body spreading part and the sleeve spreading part.

Referring to FIGS. 16 to 21, the clothing treatment apparatus 10 according to an embodiment may be configured to include the upper support part 1300, the body fixing part 1400, the body spreading part 1500, and the sleeve spreading part 1600. Furthermore, the clothing treatment apparatus 10 may further include a measuring part and the controller 800.

In an initial state in which a user disposes clothing in the clothing treatment apparatus 10, a body spreading arm 1510 of the body spreading part 1500 and a sleeve spreading arm 1610 of the sleeve spreading part 1600 may be disposed in up and down direction thereof without rotating in a left and right direction thereof (FIGS. 16 and 18).

In this case, disposing, by the user, the clothing may mean that the user hangs the clothing up on the upper support part 1300 and disposes the clothing so that the body spreading arm 1510 is disposed inside a body part of the clothing. Furthermore, this may mean that the user covers the sleeve spreading part 1600 with a sleeve part of the clothing. Furthermore, this may mean that the user couples the bottom of the body part with the body fixing part 1400.

After the clothing is disposed in the clothing treatment apparatus 10, the body spreading arm 1510 of the body spreading part 1500 may rotate (FIG. 19), and the sleeve spreading arm 1620 of the sleeve spreading part 1600 may rotate (FIG. 20). The body spreading arm 1510 and the sleeve spreading arm 1620 may sequentially rotate regardless of their order. However, if the body spreading arm 1510 and the sleeve spreading arm 1620 simultaneously rotate, clothing may not be sufficiently spread.

As the body spreading arm 1510 and the sleeve spreading arm 1620 rotate as described above, clothing can be easily and stably spread (FIGS. 17 and 21).

Each of the elements of the clothing treatment apparatus 10 is specifically described.

[Upper Support Part]

The upper support part 1300 may be detachably disposed at the upper part of the clothing treatment apparatus 10, and may be fixedly disposed at the upper part of the clothing treatment apparatus 10.

The upper support part 1300 may be formed in a hanger shape. A part that belongs to the upper support part 1300 and that supports a shoulder portion of clothing may be formed to be wide in a left and right direction thereof and may be formed as a convex curved surface. However, the upper support part 1300 is not limited to such a shape.

As the part that belongs to the upper support part 1300 and that supports the shoulder portion of the clothing is formed to be wide in the left and right direction as described above, the upper support part 1300 can support clothing having various sizes or shapes.

Furthermore, as the part that belongs to the upper support part 1300 and that supports the shoulder portion of the clothing is formed as the convex curved surface, secondary wrinkle attributable to the mounting of the clothing can be prevented because a surface wider than a shoulder line of the clothing is formed.

The upper support part 1300 may support the upper part of clothing.

[Body Fixing Part]

FIG. 22 is a perspective view illustrating the body fixing part 1400 according to an embodiment of the present disclosure.

Referring further to FIG. 22, the body fixing part 1400 according to an embodiment may be disposed below a central part of the upper support part 1300, and may be disposed to be spaced apart from the upper support part 1300. Furthermore, the body fixing part 1400 may be configured to include a body binding clip 1410 and a flexible part 1420.

[Body Binding Clip]

The body binding clip 1410 may be disposed below the central part of the upper support part 1300, and may be installed toward a body part of clothing (hereinafter a body part) that is supported by the upper support part 1300. Furthermore, the body binding clip 1410 may be coupled with the flexible part 1420 and may move up and down, and may be connected to an elastic body included in the flexible part 1420.

The body binding clip 1410 may be bound to a central part of a body part of clothing at the bottom thereof, may fix the body part of the clothing, and may spread the body part of the clothing up and down. In particular, the body binding clip 1410 may fixe the central part of the body part of clothing so that the body part of the clothing can be stably spread in a left and right direction thereof by the body spreading part 1500 to be described later.

[Flexible Part]

The flexible part 1420 may be disposed below the body binding clip 1410, and may be coupled with the body binding clip 1410. Furthermore, the flexible part 1420 may be installed in a way to be flexible up and down.

The flexible part 1420 may be configured to include the elastic body that is elastically deformed and upward extended.

As the body binding clip 1410 is disposed below the upper support part 1300 and installed toward a body part of clothing as described above, the body binding clip 1410 can fix the body part of the clothing and spread the body part of the clothing in up and down direction thereof. Furthermore, as the body binding clip 1410 can fix the body part of the clothing in the up and down direction, the body spreading part 1500 can stably spread the body part of the clothing in a diagonal or left and right direction thereof.

Furthermore, as the body binding clip 1410 is installed in a way to be movable up and down toward the body part of the clothing, clothing having various sizes or shapes can be easily stably fixed at a low cost through a simple configuration.

Furthermore, as the body binding clip 1410 is disposed below the central part of the upper support part 1300, the body binding clip 1410 may fix the central part of the body part of clothing. Accordingly, the clothing can be easily fixed even without fastening a front button on the clothing, and the clothing can be spread in up and down direction thereof.

Furthermore, as the body binding clip 1410 is connected to the elastic body included in the flexible part 1420, a sufficient tensile force may be applied to clothing by the body binding clip 1410 fastened to the bottom of the clothing. Accordingly, the clothing can be easily spread in up and down direction thereof at a low cost through a simple configuration.

[Body Spreading Part]

The body spreading part 1500 may be disposed below the upper support part 1300, and may be disposed to be spaced apart from the upper support part 1300. Furthermore, the body spreading part 1500 may be disposed on the left and right of the body part as in FIGS. 16 to 21.

The body spreading part 1500 may be configured to include the body spreading arm 1510 and a first driving part 1520.

[Body Spreading Arm]

The body spreading arm 1510 may have at least a part disposed inside a body part of clothing (hereinafter a body part) supported by the upper support part 1300, and may rotate by using one end thereof as a rotation axis.

The body spreading arm 1510 is described with reference to FIGS. 23 to 26.

FIGS. 23 to 26 are state diagrams illustrating an initial state (FIG. 23) of the body spreading arm 1510 and states (FIGS. 24 to 26) in which the body spreading arm 1510 rotates in the body spreading part 1500 according to an embodiment of the present disclosure.

Referring to FIGS. 23 to 26, the body spreading arm 1510 may be configured to include a support part 1512 and a friction part 1514.

[Support Part]

The support part 1512 may rotate by having one end coupled with the first driving part 1520. Furthermore, the support part 1512 may be coupled with the friction part 1514. Specifically, for example, the other end of the support part 1512 may be coupled with the friction part 1514. However, the support part 1512 is not limited to such a configuration.

A first through hole 1516 may be formed in the other end of the support part 1512 coupled with the friction part 1514. This is described later.

Furthermore, the support part 1512 may be made of a material, such as plastic having elasticity.

The support part 1512 may be formed to be bent in the direction in which the support part 1512 rotates toward one side of the inside of the body part.

For example, as in FIGS. 23 to 26, the support part 1512 of the body spreading arm 1510 disposed on the left in FIGS. 16 to 21 may be formed to be bent in a counterclockwise direction in which the support part 1512 rotates toward the left surface of the inside of the body part. Accordingly, although a reaction force of the clothing acts on the support part 1512 of the body spreading arm 1510, disposed on the left, in a clockwise direction or a right direction, the body spreading arm 1510 can be firmly and stably supported.

Accordingly, as an external force, such as a shearing force applied to the support part 1512 by the reaction force of the clothing, is distributed at a bent location, the clothing can be effectively and stably spread and the durability of the clothing treatment apparatus 10 can be improved because the body spreading arm 1510 can be firmly and stably supported.

Specifically, the support part 1512 may be bent at n locations, and may be formed to be bent in an arch shape.

For example, as in FIGS. 23 to 26, the support part 1512 of the body spreading arm 1510 disposed on the left in FIGS. 16 to 21 may be bent at two locations A and B, may be formed to be bent in the counterclockwise direction, and may form an arch shape.

In this case, the length of a first section including a rotation axis, among (n+1) sections divided by the n locations, may be smaller than a value obtained by dividing a total length of the (n+1) sections of the support part 1512 by n+1.

For example, in FIGS. 23 to 26, the length of a first section 1512-1 including the rotation axis, among three sections 1512-1, 1512-2, and 1512-3 divided by two locations A and B, may be smaller than a value obtained by dividing a total length of the three sections 1512-1, 1512-2, and 1512-3 by 3.

Accordingly, as the length of the first section to which a great shearing force is applied by a reaction force of clothing is small, the first section may not be easily deformed, and a maximum shearing force that acts on the first section can be reduced. Accordingly, clothing can be effectively and stably spread and the durability of the clothing treatment apparatus 10 can be improved because the body spreading arm 1510 can be firmly and stably supported.

Furthermore, with respect to the support part 1512 that has been bent at n locations and formed to be bent in an arch shape, the length of the section may be gradually increased from the first section that includes the rotation axis of the support part 1512 toward a section (e.g., an (n+1)-th section) that is coupled with the friction part 1514.

For example, in FIGS. 23 to 26, the length of the section may be gradually increased from the first section 1512-1 that includes the rotation axis toward the third section 1512-3 that is coupled with the friction part 1514.

Accordingly, each section may not be easily deformed and a maximum shearing force that acts on each section can maintain a specific value or less because the length of each section is determined in reverse order of the size of a shearing force that is applied to each section by a reaction force of clothing. Accordingly, clothing can be effectively and stably spread and the durability of the clothing treatment apparatus 10 can be improved because the body spreading arm 1510 can be firmly and stably supported.

The support part 1512 may support the friction part 1514.

[Friction Part]

The friction part 1514 may be coupled with the support part 1512, may be supported by the support part 1512, and may be subjected to friction and interference with one side of the inside of the body part. Specifically, for example, the friction part 1514 may be coupled with the other end of the support part 1512. However, the friction part 1514 is not limited to such a configuration.

The friction part 1514 may be slantly coupled with the support part 1512.

Specifically, for example, the friction part 1514 may be disposed in a rotational direction toward one side of the inside of the body part and may be disposed to be inclined inwardly and slantly toward the rotation axis of the body spreading arm 1510.

For example, as in FIGS. 23 to 26, the friction part 1514 may be disposed in the counterclockwise direction toward one side of the inside of the body part and may be disposed to be inclined inwardly and slantly toward the rotation axis of the body spreading arm 1510. That is, the friction part 1514 may not be disposed at a slope that is parallel to the circumference of a circle formed as the body spreading arm 1510 rotates or that is parallel to a tangent to the circle.

Accordingly, as in FIG. 25, a friction area between the friction part 1514 and one side of the inside of the body part of clothing (an alternated long and short dash line) can be increased. As in FIG. 26, the body part of clothing can be stably spread in a diagonal or left and right direction thereof because the body part is effectively subjected to friction and interference with the friction part 1514. Furthermore, the friction part 1514 may be disposed ahead of the support part 1512 in the direction (the counterclockwise direction in FIGS. 25 and 26) in which the friction part 1514 rotates toward one side of the inside of the body part.

As the friction part 1514 is slantly coupled with the support part 1512 as described above, a friction area between the friction part 1514 and one side of the inside of the body part of clothing may be increased. Accordingly, the body part of clothing can be stably spread in the diagonal or left and right direction because the body part is effectively subjected to friction and interference with the friction part 1514.

Furthermore, as the friction part 1514 is disposed in a rotational direction toward one side of the inside of the body part and is disposed to be inclined inwardly and slantly toward the rotation axis of the body spreading arm 1510, a friction area between the friction part 1514 and the clothing may be increased as described above. Accordingly, the body part of the clothing can be stably spread in the diagonal or left and right direction because the body part is effectively subjected to friction and interference with the friction part 1514. Furthermore, as the friction part 1514 is disposed ahead of the support part 1512 in the direction in which the friction part 1514 rotates toward one side of the inside of the body part, the support part 1512 can stably support the friction part 1514 that is subjected to friction and interference with the clothing behind the friction part 1514.

As in FIGS. 23 to 26, an outside of the friction part 1514 that is subjected to friction and interference with one side of the inside of the body part may be formed to protrude. Accordingly, as in FIG. 25, a friction area between the friction part 1514 and one surface of the inside of the body part of the clothing (the alternated long and short dash line) can be increased. As in FIG. 26, the body part of the clothing can be stably spread in the diagonal or left and right direction because the body part is effectively subjected to friction and interference with the friction part 1514.

As the outside of the friction part 1514 that is subjected to friction and interference with one side of the inside of the body part of clothing is formed to protrude as described above, a friction area between the friction part 1514 and the clothing may be increased. Accordingly, the body part of the clothing can be stably spread in the diagonal or left and right direction because the body part is effectively subjected to friction and interference with the friction part 1514.

Furthermore, a friction material may be provided on the outside of the friction part 1514 that is subjected to friction and interference with one side of the inside of the body part. The friction material may correspond to silicon or rubber, for example.

Accordingly, as a friction force between the friction part 1514 and the clothing is increased, the body part of the clothing can be stably spread in the diagonal or left and right direction because the body part is effectively subjected to friction and interference with the friction part 1514.

Furthermore, as in FIGS. 23 to 26, one end of the friction part 1514 may be formed to protrude in the direction in which the friction part 1514 rotates toward one side of the inside of the body part.

As the protruded one end of the friction part 1514 can rotate and temporarily spread the clothing while applying pressure to one side of the body part as in FIG. 24, the clothing may be subjected to friction and interference with the outside of the friction part 1514 in the state in which the clothing has been spread. Furthermore, the protruded one end of the friction part 1514 can rotate while forming bending on one side of the body part as in FIG. 24. Accordingly, one side of the inside of the body part can be easily brought into contact and subjected to friction and interference with the outside of the friction part 1514 by the bending.

As one end of the friction part 1514 is formed to protrude in the direction in which the friction part 1514 rotates toward one side of the inside of the body part as described above, the protruded one end of the friction part 1514 can rotate and temporarily spread the clothing while applying pressure to one side of the body part. Accordingly, the clothing can be subjected to friction and interference with the outside of the friction part 1514 in the state in which the clothing has been spread. Accordingly, the body part of clothing can be rapidly and stably spread because the body part is effectively subjected to friction and interference with the friction part 1514.

Furthermore, as the protruded one end of the friction part 1514 can rotate while forming bending on one side of the body part, one side of the inside of the body part can be easily brought into contact and subjected to friction and interference with the outside of the friction part 1514 by the bending. Accordingly, the body part of clothing can be rapidly and stably spread because the body part is effectively subjected to friction and interference with the friction part 1514.

The friction part 1514 may be coupled with the other end of the support part 1512. The first through hole 1516 may be formed in the other end of the support part 1512.

Accordingly, the slope of the friction part 1514 can be easily changed because the other end of the support part 1512 is easily elastically deformed by a reaction force of clothing that acts on the friction part 1514. Accordingly, the body part of clothing having various sizes or shapes can be easily and stably spread in the diagonal or left and right direction at a low cost through a simple configuration. Furthermore, weight of the support part 1512 can be reduced.

The friction part 1514 may be subjected to friction and interference with one side of the inside of the body part of clothing, and may spread the clothing.

[First Driving Part]

The first driving part 1520 may be disposed below the upper support part 1300 in a way to be spaced apart from the upper support part 1300, and may be coupled with one end of the support part 1512 that is included in the body spreading arm 1510.

The first driving part 1520 may rotate the support part 1512 that is included in the body spreading arm 1510.

As described above, the body spreading part 1500 disposed below the upper support part 1300 may be configured to include the body spreading arm 1510 and the first driving part 1520. The body spreading arm 1510 may have at least a part disposed inside the body part of clothing supported by the upper support part 1300, and may rotate by using one end thereof as a rotation axis. The first driving part 1520 may rotate the body spreading arm 1510. Accordingly, the body part of the clothing can be easily, effectively, and stably spread in a diagonal or left and right direction thereof at a low cost. Furthermore, as the body part of the clothing can be spread in the diagonal direction thereof, fixing means for spreading the body part in up and down direction or a left and right direction thereof can be minimized. Furthermore, as the body spreading arm 1510 can rotate on one plane and spread the clothing, the body spreading part 1500 can be installed in a small space.

Furthermore, the body spreading part 1500 may be configured to include the left body spreading part disposed on the left of the body part and the right body spreading part disposed on the right of the body part. Accordingly, the clothing can be stably spread in the diagonal or left and right direction because the body part of the clothing can be simultaneously spread to the left and the right.

[Sleeve Spreading Part]

As in FIGS. 16 to 21, the sleeve spreading parts 1600 may be disposed below the upper support part 1300, and may be disposed on the left and the right, respectively. Furthermore, the sleeve spreading part 1600 may be disposed at a location corresponding to a sleeve part at a lateral end of clothing that is supported by the upper support part 1300. A detailed configuration of the sleeve spreading part 1600 is described later with reference to FIGS. 27 to 30.

The sleeve spreading part 1600 may spread a sleeve part of clothing (hereinafter a sleeve part) that is supported by the upper support part 1300.

FIGS. 27 and 28 are a perspective view and a front view illustrating an initial state in which the sleeve spreading arm has not been spread in the sleeve spreading part according to an embodiment of the present disclosure. FIGS. 29 and 30 are a perspective view and a front view illustrating the state in which the sleeve spreading arm has been spread in the sleeve spreading part according to an embodiment of the present disclosure. FIG. 31 is a front view illustrating a sleeve spreading part according to another embodiment of the present disclosure.

Referring to FIGS. 27 to 31, the sleeve spreading part 1600 may be configured to include a fixing part 1610, the sleeve spreading arm 1620, a second driving part 1630, a link part 1640, and a sleeve binding clip 1650.

[Fixing Part]

The fixing part 1610 may be disposed below the upper support part 1300 in a way to be spaced apart from the upper support part 1300. Furthermore, the fixing part 1610 may have at least a part fixedly disposed inside a sleeve part in up and down direction thereof.

Furthermore, the fixing part 1610 may include an accommodation part 1612 that accommodates the sleeve spreading arm 1620.

Accordingly, in the initial state of the sleeve spreading part 1600, the sleeve spreading arm 1620 may be accommodated in the accommodation part 1612, and can easily cover the sleeve spreading part 1600 with a sleeve part of clothing.

The fixing part 1610 may support the other side of the inside of the sleeve part. Accordingly, the sleeve spreading arm 1620 may be spread and subjected to friction and interference with one side of the inside of the sleeve part so that the sleeve part can be spread.

[Sleeve Spreading Arm]

The sleeve spreading arm 1620 may have at least a part disposed inside the sleeve part, may rotate by using one end thereof as a rotation axis, and may be subjected to friction and interference with one side of the inside of the sleeve part. The sleeve spreading arm 1620 may be made of an elastic material, such as plastic.

Furthermore, as in FIGS. 17, 20, and 21, the sleeve spreading arm 1620 may rotate toward the central part of the body part of clothing, and may be subjected to friction and interference with one side of the inside of the sleeve part.

Accordingly, the sleeve spreading part 1600 can be installed in a small space.

As in FIGS. 27 to 30, the sleeve spreading arm 1620 may be coupled with the link part 1640, and a sliding hole 1622 coupled with the link part 1640 may be formed in the sleeve spreading arm 1620. However, the sleeve spreading arm 1620 is not limited to such a configuration. For example, unlike FIGS. 27 to 30, the sleeve spreading arm 1620 may have one end coupled with the second driving part 1630.

As in FIG. 31, an outside of the sleeve spreading arm 1620, which is subjected to friction and interference with one side of the inside of the sleeve part, may be formed to protrude.

Accordingly, as a friction area between the sleeve spreading arm 1620 and the clothing is increased, the sleeve part of the clothing can be stably spread in a diagonal or left and right direction thereof because the sleeve part is effectively subjected to friction and interference with the sleeve spreading arm 1620.

Furthermore, a friction material may be provided on the outside of the sleeve spreading arm 1620, which is subjected to friction and interference with one side of the inside of the sleeve part. The friction material may correspond to silicon or rubber, for example.

Accordingly, as a friction force between the sleeve spreading arm 1620 and the clothing is increased, the sleeve part of the clothing can be stably spread in the diagonal or left and right direction because the sleeve part is effectively subjected to friction and interference with the sleeve spreading arm 1620.

A second through hole 1624 may be formed in the sleeve spreading arm 1620.

Accordingly, as the sleeve spreading arm 1620 can be easily elastically deformed by a reaction force of clothing that acts on the sleeve spreading arm 1620, the sleeve part of clothing having various sizes or shapes can be easily and stably spread in the diagonal or left and right direction at a low cost through a simple configuration. Furthermore, weight of the sleeve spreading arm 1620 can be reduced.

[Second Driving Part]

The second driving part 1630 may be disposed below the upper support part 1300 in a way to be spaced apart from the upper support part 1300, and may be coupled with one end of the link part 1640 as in FIGS. 27 to 30. However, the second driving part 1630 is not limited to such a configuration. For example, unlike FIGS. 27 to 30, the second driving part 1630 may be coupled with one end of the sleeve spreading arm 1620.

The second driving part 1630 may rotate one end of the sleeve spreading arm 1620 and/or the link part 1640.

As described above, the sleeve spreading part 1600 disposed below the upper support part 1300 may be configured to include the fixing part 1610, the sleeve spreading arm 1620, and the second driving part 1630. The fixing part 1610 may have at least a part disposed inside a sleeve part of clothing in up and down direction thereof. The sleeve spreading arm 1620 may have at least a part disposed inside a body part of the clothing supported by the upper support part 1300, and may rotate by using one end thereof as a rotation axis. The second driving part 1630 may rotate the sleeve spreading arm 1620. Accordingly, the sleeve part of the clothing can be easily, effectively, and stably spread in a diagonal or left and right direction thereof at a low cost. Furthermore, as the sleeve part of the clothing can be spread in the diagonal direction thereof, fixing means for spreading the sleeve part in the up and down direction or the left and right direction can be minimized. Furthermore, as the sleeve spreading arm 1620 can rotate on one plane and spread the clothing, the sleeve spreading part 1600 can be installed in a small space.

[Link Part]

The link part 1640 may have one end coupled with the second driving part 1630 and the other end coupled with the sleeve spreading arm 1620.

Specifically, for example, the sliding hole 1622 may be formed in one side of the sleeve spreading arm 1620. A protruded part 1642 that penetrates the sliding hole 1622 and slides and moves along the sliding hole 1622 may be provided at the other end of the link part 1640.

The sleeve spreading arm 1620 can rotate in response to the rotation of the link part 1640.

As described above, one end of the link part 1640 may be coupled with the second driving part 1630 and the other end thereof may be coupled with the sleeve spreading arm 1620, and the sleeve spreading arm 1620 may rotate in response to the rotation of the link part 1640. Since the second driving part 1630 can drive the sleeve spreading arm 1620 through the link part 1640, the second driving part 1630 does not need to be disposed inside a sleeve part of clothing in order to drive the sleeve spreading arm 1620, and may be disposed to be spaced apart from the sleeve part. Accordingly, since the size of the second driving part 1630 does not need to be small, a cost can be reduced, and the second driving part 1630 can be prevented from being damaged by steam that is sprayed onto the sleeve part of the clothing.

Furthermore, the sliding hole 1622 may be formed in one side of the sleeve spreading arm 1620, and the protruded part 1642 that penetrates the sliding hole 1622 and slides and moves along the sliding hole 1622 may be provided at the other end of the link part 1640. The second driving part 1630 can easily and stably drive the sleeve spreading arm 1620 through the link part 1640 at a low cost through a simple configuration.

[Sleeve Binding Clip]

The sleeve binding clip 1650 may be provided at the lower part of the fixing part 1610, and may be coupled with the end of the sleeve part of clothing. The sleeve binding clip 1650 may come into contact with one surface of the fixing part 1610.

The sleeve binding clip 1650 may fix the end of the sleeve part, and may spread the sleeve part in up and down direction thereof. A method of fixing the end of the sleeve part to the sleeve binding clip 1650 is as follows.

After the fixing part 1610 is covered with the sleeve part of the clothing by sliding and moving the sleeve part from the upper part of the fixing part 1610 to the lower part thereof, when the end of the sleeve part is pushed in between the fixing part 1610 and the sleeve binding clip 1650 that comes into contact with the fixing part 1610, the end of the sleeve part may be fixed to the sleeve binding clip 1650.

As the sleeve binding clip 1650 that comes into contact with one surface of the fixing part 1610 is provided at the lower part of the fixing part 1610 as described above, when the fixing part 1610 is covered with the sleeve part of the clothing, the sleeve part can be fixed by pushing the end of the sleeve part between the fixing part 1610 and the sleeve binding clip 1650. The sleeve part can be easily and rapidly fixed at a low cost through a simple configuration, and can be spread in up and down direction thereof.

[Measuring Part]

The measuring part may be provided in the first driving part 1520, the second driving part 1630, the body spreading arm 1510 or the sleeve spreading arm 1620, etc. Furthermore, the measuring part may be connected to the controller 800.

The measuring part may measure a reaction force of clothing that acts on the body spreading arm 1510 or the sleeve spreading arm 1620, and may deliver a measured value to the controller 800.

Specifically, the measuring part may correspond to a sensor which measures a current, pressure, etc. For example, the measuring part may be provided in the first driving part 1520 or the second driving part 1630, and may measure a reaction force of clothing that acts on the body spreading arm 1510 or the sleeve spreading arm 1620 based on the amount of current applied to the first driving part 1520 or the second driving part 1630 or a change in the current.

Furthermore, for example, the measuring part may be provided in the body spreading arm 1510 or the sleeve spreading arm 1620, and may measure a reaction force of clothing that acts on the body spreading arm 1510 or the sleeve spreading arm 1620 based on a pressure size that acts on the body spreading arm 1510 or the sleeve spreading arm 1620 or a change in the pressure size.

As described above, as the measuring part measures a reaction force of clothing that acts on the body spreading arm 1510 or the sleeve spreading arm 1620 based on a change in the current applied to the first driving part 1520 or the second driving part 1630, a reaction force of clothing can be easily measured at a low cost through a simple configuration.

[Controller]

The controller 800 may be connected to the measuring part, and may be connected to the first driving part 1520 or the second driving part 1630.

The controller 800 may receive a measured value from the measuring part, and may control the rotation of the first driving part 1520 or the second driving part 1630 based on the measured value. In this case, controlling the rotation may mean controlling a rotation angle, a rotating speed, etc.

As the measuring part measures a reaction force of clothing that acts on the body spreading arm 1510 or the sleeve spreading arm 1620 and the controller controls the rotation of the first driving part 1520 or the second driving part 1630 based on a measured value of the measuring part as described above, damage to the clothing can be prevented and the clothing can be effectively and stably spread because a suitable tensile force can be applied to the clothing based on a size, shape, or material of the clothing.

Hereinafter, a method of controlling the clothing treatment apparatus is described.

FIG. 32 is a flowchart illustrating a method of controlling the clothing treatment apparatus according to an embodiment of the present disclosure.

Referring to FIG. 32, a method 1700 of controlling the clothing treatment apparatus according to an embodiment is configured to include a driving step S1710, a measuring step S1720, and a control step S1730.

In the driving step S1710, the body spreading arm 1510 of the clothing treatment apparatus 10 may be rotated by the first driving part 1520, and may be subjected to friction and interference with one side of the inside of a body part of clothing. Furthermore, the sleeve spreading arm 1620 of the clothing treatment apparatus 10 may be rotated by the second driving part S430, and may be subjected to friction and interference with one side of the inside of a sleeve part of the clothing.

In the measuring step S1720, the clothing treatment apparatus 10 may measure a reaction force of the clothing that acts on the body spreading arm 1510 or the sleeve spreading arm 1620.

In the control step S1730, the clothing treatment apparatus 10 may control the rotation of the first driving part 1520 or the second driving part 1630 based on a measured value measured in the measuring step S1720.

As the method includes the driving step S1710 of the body spreading arm 1510 or the sleeve spreading arm 1620 being rotated by the first driving part 1520 or the second driving part 1630 and spreading clothing, the measuring step S1720 of measuring a reaction force of the clothing that acts on the body spreading arm 1510 or the sleeve spreading arm 1620, and the control step S1730 of controlling the rotation of the first driving part 1520 or the second driving part 1630 based on a measured value measured in the measuring step S1720 as described above, damage to the clothing can be prevented and the clothing can be effectively and stably spread because a tensile force can be applied to the clothing based on a size, shape, or material of the clothing.

Although the present disclosure has been described with reference to the illustrated drawings as described above, it is evident that the present disclosure is not restricted by the embodiments and drawings disclosed in this specification and may be modified in various ways by those skilled in the art without departing from the technical spirit of the present disclosure. Although acting effects according to the configurations of the present disclosure have not been explicitly described while the embodiments of the present disclosure are described, effects which may be predicted by a corresponding configuration should also be recognized.

| [Description of reference numerals] | |
|---|---|
| 10: clothing treatment apparatus | |
| 100: heating part | |
| 200: movable spray part | |
| 210: inlet | 220: spray port |
| 230: spray pipe | 240: support member |
| 250: first coupling part | 260: second coupling part |
| 270: third coupling part | |
| 300: flow path member | |
| 310: unit member | 310a: chain member |
| 311: side plate | 312: lower plate |
| 313: coupling part | 314: upper plate |
| 315: coupling part | 316: lower step |
| 318: upper step | |
| 400: driving part | |
| 410: driving motor | 420: ball screw bolt |
| 430: ball screw nut | |
| 500: first guide part | |
| 510: first guide rail | 520: first guide coupling part |
| 600: second guide part | |
| 610: second guide rail | 620: second guide coupling part |
| 700: third guide part | |
| 710: third guide rail | 720: third guide coupling part |
| 730: protruded part | |
| 800: controller | |
| 900: second flow path pipe | |
| 1000: third flow path pipe | |
| 1100: support part | 1110: support |
| 1200: bracket | |
| 1300: upper support part | |
| 1400: body fixing part | |
| 1410: body binding clip | 1420: flexible part |
| 1500: body spreading part | |
| 1510: body spreading arm | 1512: support part |
| 1514: friction part | 1516: first through hole |
| 1520: first driving part | |
| 1600: sleeve spreading part | |
| 1610: fixing part | 1620: sleeve spreading arm |
| 1622: sliding hole | 1624: second through hole |
| 1630: second driving part | |
| 1640: link part | 1642: protruded part |
| 1650: sleeve binding clip | |
| 1700: method of controlling clothing treatment apparatus | |

The invention claimed is:

1. A clothing treatment apparatus comprising:
 a heater configured to heat a fluid;
 a spray part configured to move in a first direction and spray the heated fluid;
 a flow path connected to the heater and the spray part and configured to supply the heated fluid to the spray part; and
 a driver configured to move the spray part in the first direction,
 wherein the flow path includes a plurality of segments and is configured to be curved or spread at an angle having a specific range for each of the segments in response to a movement of the spray part, and wherein a maximum angle at which each of the segments is curved in one direction is greater than a maximum angle at which each of the segments is curved in an opposite direction, or the flow path is configured to be curved only in one direction based on the flow path having been spread.

2. The clothing treatment apparatus of claim 1, wherein the spray part is disposed above the heater.

3. The clothing treatment apparatus of claim 1, wherein the spray part comprises:

an inlet configured to introduce the heated fluid;

a plurality of spray ports configured to spray the heated fluid; and a spray pipe being in fluid communication with the inlet and disposed in a second direction perpendicular to the first direction, wherein the plurality of spray ports are defined along a length of the spray pipe.

4. The clothing treatment apparatus of claim 3, wherein the inlet is defined at a lower part of the spray part.

5. The clothing treatment apparatus of claim 4, wherein a lower part of the spray pipe is in fluid communication with the inlet and is inclined downward.

6. The clothing treatment apparatus of claim 3, wherein the spray part includes a plurality of spray pipes, and wherein the plurality of spray ports defined at at least two of the plurality of spray pipes have different heights from each other.

7. The clothing treatment apparatus of claim 3, wherein the spray part includes a plurality of spray pipes, and wherein at least one support member is provided between at least two of the plurality of spray pipes and supports the plurality of spray pipes.

8. The clothing treatment apparatus of claim 7, wherein the at least one support member includes a plurality of support members spaced apart from each other and arranged between two of the plurality of spray pipes.

9. The clothing treatment apparatus of claim 1, wherein the driver is coupled with a central part of the spray part, and wherein the driver is configured to move the spray part in the first direction.

10. The clothing treatment apparatus of claim 9, further comprising a first guide disposed around the central part of the spray part, wherein the first guide includes a first guide rail and a first guide coupler coupled to the first guide rail and configured to slide along the first guide rail, and wherein the driver is coupled with the central part of the spray part and the first guide coupler, and configured to move the spray part in the first direction.

11. The clothing treatment apparatus of claim 9, further comprising one or more guides disposed around at least one of upper and lower parts of the spray part, wherein the one or more guides include one or more guide rails, and wherein the spray part is coupled with the one or more guide rails and configured to slide along the one or more guide rails.

12. The clothing treatment apparatus of claim 1, wherein an exterior of the spray part is coated with an insulator.

13. The clothing treatment apparatus of claim 1, wherein the spray part includes a plurality of spray parts, wherein the plurality of spray parts are spaced apart from each other in a third direction perpendicular to the first direction, and wherein the clothing treatment apparatus further includes a controller configured to control individual movements of the plurality of spray parts.

14. The clothing treatment apparatus of claim 1, wherein the flow path is disposed in the first direction, wherein the flow path is overturned at one side such that a part of the flow path is turned upside down, wherein the part of the flow path that has been turned upside down is disposed above another part of the flow path, and wherein an end of the part of the flow path is coupled with the spray part.

15. The clothing treatment apparatus of claim 14, wherein, based on the part of the flow path being spread, the part of the flow path is inclined downwards toward the one side or positioned horizontally.

16. The clothing treatment apparatus of claim 14, further comprising a support part disposed under the flow path and configured to support the flow path, wherein the support part includes a plurality of supports spaced apart from each other in the first direction, and wherein an upper cross section of each of the supports is curved in a streamlined shape.

17. The clothing treatment apparatus of claim 1, further comprising a second flow path including a pipe and having first and second ends, the first end of the second flow path being in fluid communication with a first end of the flow path that is opposite to a second end of the flow path coupled with the spray part, and the second end of the second flow path being connected to the heater, and wherein at least a part of the second flow path is immovable at the clothing treatment apparatus.

18. The clothing treatment apparatus of claim 17, wherein the flow path, the second flow path, and the spray part are each provided in plural, wherein the flow path, the second flow path, and the spray part are in fluid communication with each other, and wherein the clothing treatment apparatus further includes a third flow path including a pipe and having first and second ends, the first end of the third flow path being in fluid communication with ends of a plurality of second flow paths, and the second end of the third flow path being connected to the heater.

19. The clothing treatment apparatus of claim 1, wherein the flow path includes:

a chain curved at an angle having a specific range for each unit of the chain, and a flow path pipe that is flexible and disposed in parallel with the chain in a longitudinal direction of the chain and configured to follow the curvature of the chain.

* * * * *